United States Patent
Yano

(10) Patent No.: US 7,113,634 B2
(45) Date of Patent: Sep. 26, 2006

(54) STEREOSCOPIC IMAGE FORMING APPARATUS, STEREOSCOPIC IMAGE FORMING METHOD, STEREOSCOPIC IMAGE FORMING SYSTEM AND STEREOSCOPIC IMAGE FORMING PROGRAM

(75) Inventor: Kotaro Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 824 days.

(21) Appl. No.: 10/207,457

(22) Filed: Jul. 29, 2002

(65) Prior Publication Data

US 2003/0026474 A1 Feb. 6, 2003

(30) Foreign Application Priority Data

| | | | |
|---|---|---|---|
| Jul. 31, 2001 | (JP) | | 2001-232697 |
| Jul. 31, 2001 | (JP) | | 2001-232698 |
| Jul. 31, 2001 | (JP) | | 2001-232700 |

(51) Int. Cl.
*G06K 9/00* (2006.01)

(52) U.S. Cl. ..................... 382/154; 382/106
(58) Field of Classification Search .............. 382/106
See application file for complete search history.

(56) References Cited

U.S. PATENT DOCUMENTS 5,696,596 A * 12/1997 Taniguchi .............. 358/300
5,812,152 A * 9/1998 Torigoe et al. ............ 347/2
5,993,001 A * 11/1999 Bursell et al. ............ 351/212
6,268,880 B1 * 7/2001 Uomori et al. ............ 348/47
6,269,175 B1 * 7/2001 Hanna et al. .............. 382/107

FOREIGN PATENT DOCUMENTS

| | | |
|---|---|---|
| JP | 05210181 | 8/1993 |
| JP | 0814116 | 5/1996 |

* cited by examiner

*Primary Examiner*—Joseph Mancuso
*Assistant Examiner*—Alex Liew
(74) *Attorney, Agent, or Firm*—Cowan, Liebowitz & Latman, P.C.

(57) ABSTRACT

There is provided a stereoscopic image forming apparatus which can reduce the image memory capacity and the time required for synthesizing a three-dimensional striped image. A three-dimensional image is synthesized such that pixels of the same coordinates in respective images of a multiple viewpoint image sequence of the subject viewed from a plurality of viewpoints are arranged as adjacent pixels in accordance with the arrangement of the viewpoints of the images based on the acquired subject image and an acquired parallax map corresponding thereto. Pixels values of the subject image corresponding to the respective pixels of the three-dimensional image are found according to a parallax deviation derived from the corresponding parallax map and are written into the respective pixels of the three-dimensional image. The synthesized three-dimensional image is outputted, whereby a stereoscopic image can be observed through an optical member having a cyclic structure superposed on the outputted image.

17 Claims, 18 Drawing Sheets

STEREOSCOPIC IMAGE FORMING APPARATUS, STEREOSCOPIC IMAGE FORMING METHOD, STEREOSCOPIC IMAGE FORMING SYSTEM AND STEREOSCOPIC IMAGE FORMING PROGRAM

BACKGROUND OF THE INVENTION

1. Field of the Invention

The present invention relates to a stereoscopic image forming apparatus, stereoscopic image forming method, stereoscopic image forming system and stereoscopic image forming program that can be suitably applied to formation of a stereoscopic image.

2. Description of the Related Art

Conventionally, the integral photography and the three-dimensional lenticular sheet image system are known as methods for forming a stereoscopic image (Okoshi, T. 1976, "Three-dimensional imaging techniques", New York: Academic Press).

Such stereoscopic image forming methods are based on the photography. For example, in the method using the three-dimensional lenticular sheet image system, a three-dimensional lenticular sheet image is formed by shooting a subject from a plurality of different viewpoints to acquire respective images and printing these images on one photographic plate through a lenticular sheet. The conventional stereoscopic image forming method has the following disadvantages (1) to (3):

(1) An elaborate and large-scale shooting apparatus such as a multi-lens camera is required since images of a subject shot from multiple viewpoints are required;

(2) Similarly, an elaborate, large-scale printing apparatus is required for forming a stereoscopic image; and (3) Specific adjustment and skill are required in shooting and printing even with the use of those elaborate, large-scale shooting and printing apparatuses.

To overcome the above disadvantages, a method has been proposed which comprises shooting a subject from two viewpoints at the right and left by a camera to which is mounted a stereophotographing adapter to acquire a pair of stereo images, and synthesizing a stereoscopic image from the pair of stereo images through electronic interpolation. This method, however, has a problem of requiring the stereophotographing adapter not required by normal shooting.

It is therefore ideal to acquire multiple viewpoint images from one image to form a stereoscopic image. An example of this method to obtain multiple viewpoint images from one image would comprise cutting out a subject region from the background in an image, and displacing a background image and a subject image by a predetermined parallax to synthesize a stereoscopic image when multiple viewpoint images are generated so that a user can feel as if the cutout subject region were coming up close when viewing the image with the lenticular sheet superposed on the image.

However, an apparatus that implements the above conventional method requires a large image memory capacity because multiple viewpoint images are temporarily generated from one image and thereafter a three-dimensional striped image is synthesized. Moreover, much time is required to synthesize the stereoscopic image, which must be reduced.

SUMMARY OF THE INVENTION

It is therefore an object of the present invention to provide a stereoscopic image forming apparatus, a stereoscopic image forming method, a stereoscopic image forming system, and a stereoscopic image forming program, which can reduce the image memory capacity and the time required for synthesizing a three-dimensional striped image.

To attain the above object, in a first aspect, the present invention provides an image forming apparatus comprising image acquiring means for acquiring an image of a subject as a subject image, parallax map acquiring means for acquiring a parallax map corresponding to the subject image acquired by the image acquiring means and representing a depth distribution of the subject, image processing means for synthesizing a three-dimensional image such that pixels of same coordinates in respective images of a multiple viewpoint image sequence of the subject viewed from a plurality of viewpoints are arranged as adjacent pixels in accordance with an arrangement of the viewpoints of the images based on the subject image acquired by the image acquiring means and the parallax map acquired by the parallax map acquiring means, output means for outputting the three-dimensional image synthesized by the image processing means, and an optical member having a cyclic structure superposed on the three-dimensional image outputted from the output means, wherein the image processing means comprises first means for finding viewpoint positions and pixel positions to which the multiple viewpoint image sequence belongs with respect to respective pixels of the three-dimensional image to be synthesized, second means for finding a parallax deviation from the parallax map acquired by the parallax map acquiring means based on the viewpoint positions and the pixel positions acquired by the first means, third means for finding pixels values of the subject image corresponding to the respective pixels of the three-dimensional image according to the parallax deviation acquired by the second means, and fourth means for writing the pixel values of the subject image acquired by the third means into the respective pixels of the three-dimensional image.

The output means is typically a printer.

The optical member is typically a lenticular sheet.

In a preferred form, the parallax map acquiring means comprises subject region acquiring means for acquiring a subject region based on the subject image acquired by the image acquiring means, and parallax map extracting means for extracting a parallax map based on the subject region acquired by the subject region acquiring means.

In a preferred form, the image acquiring means acquires the subject image of the subject viewed from the plurality of viewpoints, and the parallax map acquiring means extracts a parallax map based on the subject image of the subject viewed from the plurality of viewpoints.

In a preferred form, the second means comprises fifth means for finding a first parallax deviation from parallaxes in the parallax map at the pixel positions of the subject image corresponding to the respective pixels of the three-dimensional image by using the viewpoint positions and the pixel positions found by the first means, and sixth means for finding a second parallax deviation from the parallax map acquired by the parallax map acquiring means by using the viewpoint positions and the pixel positions found by the first means, and then correcting the second parallax deviation based on the first parallax deviation.

To attain the above object, in a second aspect, the present invention provides an image forming method executed by a stereoscopic image forming apparatus comprising image acquiring means for acquiring an image of a subject as a subject image, parallax map acquiring means for acquiring a parallax map corresponding to the subject image acquired by the image acquiring means and representing a depth distribution of the subject, image processing means for subject image, and output means for outputting the three-dimensional image synthesized by the image processing means such that a stereoscopic image of the subject can be observed through an optical member having a cyclic structure superposed on the three-dimensional image, the method comprising a first step of finding viewpoint positions and pixel positions to which the multiple viewpoint image sequence belongs with respect to respective pixels of the three-dimensional image to be synthesized, a second step of finding a parallax deviation from the parallax map acquired by the parallax map acquiring means based on the viewpoint positions and the pixel positions acquired in the first step, a third step of finding pixels values of the subject image corresponding to the respective pixels of the stereoscopic image according to the parallax deviation acquired in the second step, and a fourth step of writing the pixel values of the image of the subject acquired in the third step into the respective pixels of the three-dimensional image.

In a preferred form, the second step comprises a fifth step of finding a first parallax deviation from parallaxes in the parallax map at the pixel positions of the subject image corresponding to the respective pixels of the three-dimensional image by using the viewpoint positions and the pixel positions found in the first step, and a sixth step of finding a second parallax deviation from the parallax map acquired by the parallax map acquiring means by using the viewpoint positions and the pixel positions found in the first step, and then correcting the second parallax deviation based on the first parallax deviation.

In a further preferred form, the second step comprises a fifth step of finding a first parallax deviation from parallaxes in the parallax map at the pixel positions of the subject image corresponding to the respective pixels of the three-dimensional image by using the viewpoint positions and the pixel positions found in the first step, and a sixth step of finding a second parallax deviation from the parallax map acquired by the parallax map acquiring means by using the viewpoint positions and the pixel positions found in the first step, and then correcting the second parallax deviation based on the first parallax deviation.

To attain the above object, in a third aspect, the present invention provides a stereoscopic image forming method that enables a stereoscopic image of a subject to be observed through an optical member having a cyclic struture by synthesizing multiple viewpoint images into a stereoscopic image, printing the stereoscopic image by printing means, and superposing the optical member on the printed stereoscopic image, comprising a dividing step of dividing a three-dimensional image and synthesizing the divided three-dimensional images, and a control step of providing control such that the synthesized divided three-dimensional images are sequentially outputted to the printing means.

In a preferred form, the control step comprises finding viewpoint positions in the multiple viewpoint images to which respective lines of the three-dimensional image to be outputted belong and image regions in images at the viewpoint positions corresponding to the respective lines of the three-dimensional image, generating image data of three-dimensional image of the respective lines reversed in vertical and horizontal directions from the image regions, and sequentially outputting the image data to the printing means.

In a further preferred form, the control step comprises finding viewpoint positions and pixel positions in the multiple viewpoint images to which respective pixels of respective blocks of the three-dimensional image to be outputted belong, sequentially writing pixels in images at the viewpoint positions into the pixels of the three-dimensional image, generating image data of the respective blocks of the three-dimensional image, and sequentially outputting the image data to the printing means.

To attain the above object, in a fourth aspect, the present invention provides a stereoscopic image forming system that that enables a stereoscopic image of a subject to be observed through an optical member having a cyclic structure by synthesizing multiple viewpoint images into a stereoscopic image, printing the stereoscopic image by printing means, and superposing the optical member on the printed stereoscopic image, comprising control means for providing control such that a three-dimensional image is divided, the divided three-dimensional images are synthesized, and the synthesized divided three-dimensional images are sequentially outputted to the printing means.

In a preferred form, the control means finds viewpoint positions in the multiple viewpoint images to which respective lines of the three-dimensional image to be outputted belong and image regions in images at the viewpoint positions corresponding to the respective lines of the three-dimensional image, generates image data of three-dimensional image of the respective lines reversed in vertical and horizontal directions from the image regions, and sequentially outputs the image data to the printing means.

In a preferred form, the control means finds viewpoint positions and pixel positions in the multiple viewpoint images to which respective pixels of respective blocks of the three-dimensional image to be outputted belong, sequentially writes pixels in images at the viewpoint positions into the pixels of the three-dimensional image, generates image data of the respective blocks of the three-dimensional image, and sequentially outputs the image data to the printing means.

To attain the above object, in a fifth aspect, the present invention provides a stereoscopic image forming system that comprises image acquiring means for acquiring multiple viewpoint images of a subject viewed from a plurality of viewpoints, image processing means for synthesizing a three-dimensional image such that pixels of same coordinates in respective images of the multiple viewpoint images of the subject are arranged as adjacent pixels in accordance with an arrangement of the viewpoints of the images, and printing means for printing the three-dimensional image, wherein a stereoscopic image of the subject can be observed through an optical member having a cyclic structure and superposed on the three-dimensional image printed by the printing means, and wherein the image processing means divides the three-dimensional image and synthesizes the divided stereoscopic images, and sequentially outputs the synthesized divided stereoscopic images to the printing means.

In a preferred form, the image processing means finds viewpoint positions in the multiple viewpoint images to which respective lines of the three-dimensional image to be outputted belong and image regions in images at the viewpoint positions corresponding to the respective lines of the three-dimensional image, generates image data of three-dimensional image of the respective lines reversed in vertical and horizontal directions from the image regions, and sequentially outputs the image data to the printing means.

In a preferred form, the image processing means finds viewpoint positions and pixel positions in the multiple viewpoint images to which respective pixels of respective blocks of the three-dimensional image to be outputted belong, sequentially writes pixels in images at the viewpoint positions into the pixels of the three-dimensional image, generates image data of the respective blocks of the three-dimensional image, and sequentially outputs the image data to the printing means.

To attain the above object, in a sixth aspect, the present invention provides a stereoscopic image forming system comprising image acquiring means for acquiring an image of a subject as a subject image, region acquiring means for acquiring a subject region from the subject image, parallax map extracting means for extracting a parallax map representing a depth distribution of the subject from the subject region, multiple viewpoint image generating means for generating multiple viewpoint images of the subject viewed from a plurality of viewpoints based on the subject image and the parallax map, image synthesizing means for synthesizing a three-dimensional image such that pixels of same coordinates in respective ones of the multiple viewpoint images of the subject are arranged as adjacent pixels in accordance with an arrangement of the viewpoints of the images, and output means for outputting the synthesized three-dimensional such that a stereoscopic image of the subject can be observed through an optical member having a cyclic structure superposed on the three-dimensional image.

In a preferred form, the subject region corresponds to respective pixels of the subject image, and comprises two-dimensional array mask data representative of whether the subject region is a subject or a background, and the parallax extracting means extracts the parallax map by blurring the mask data by two-dimensional filtering.

In a preferred form, the parallax extracting means estimates a three-dimensional form of the subject from the subject region, and extracts the parallax map based on the estimated three-dimensional form.

To attain the above object, in a seventh aspect, the present invention provides a stereoscopic image forming system comprising image acquiring means for acquiring an image of a subject as an image of a subject, geometric model storage means for storing at least one three-dimensional geometric model, three-dimensional form acquiring means for making the geometric model correspond to the subject image to acquire a three-dimensional form of the subject, parallax map extracting means for extracting a parallax map from the acquired three-dimensional form, multiple viewpoint image generating means for generating multiple viewpoint images of the subject viewed from a plurality of viewpoints based on the subject image and the parallax map, image synthesizing means for synthesizing a three-dimensional image such that pixels of same coordinates in respective ones of the multiple viewpoint images of the subject are arranged as adjacent pixels in accordance with an arrangement of the viewpoints of the images, and output means for outputting the synthesized three-dimensional image, wherein a stereoscopic image of the subject can be observed through an optical member having a cyclic structure superposed on the outputted three-dimensional image.

In a preferred form, the stereoscopic image forming system according to the seventh aspect comprises parallax map evaluating means for evaluating the extracted parallax map.

In a preferred form, the output means is printing means.

In a preferred form, the stereoscopic image forming system according to the seventh aspect further comprises image recording means for recording the subject image acquired by the image acquiring means as digital image data. The image recording means transfers the digital image data via a network.

To attain the above object, in an eighth aspect, the present invention provides a stereoscopic image forming method comprising the steps of acquiring an image of a subject as a subject image, acquiring a subject region from the subject image, extracting a parallax map representing a depth distribution of the subject from the subject region, generating multiple viewpoint images of the subject viewed from a plurality of viewpoints based on the subject image and the parallax map, synthesizing a three-dimensional image such that pixels of same coordinates in respective ones of the multiple viewpoint images of the subject are arranged as adjacent pixels in accordance with an arrangement of the viewpoints of the images, and outputting the synthesized three-dimensional image such that the synthesized three-dimensional image can be observed through an optical member having a cyclic structure superposed synthesized three-dimensional image.

In a preferred form, the subject region corresponds to respective pixels of the subject image, and comprises two-dimensional array mask data representative of whether the subject region is a subject or a background, and in the step of extracting the parallax map, the parallax map is extracted by blurring the mask data by two-dimensional filtering.

In a preferred form, in the step of extracting the parallax map, a three-dimensional form of the subject is estimated from the subject region, and the parallax map is extracted based on the estimated three-dimensional form.

To attain the above object, in a ninth aspect, the present invention provides a stereoscopic image forming method comprising the steps of acquiring an image of a subject as an image of a subject, storing at least one three-dimensional geometric model, making the geometric model correspond to the subject image to acquire a three-dimensional form of the subject, extracting a parallax map from the acquired three-dimensional form, generating multiple viewpoint images of the subject viewed from a plurality of viewpoints based on the subject image and the parallax map, synthesizing a three-dimensional image such that pixels of same coordinates in respective ones of the multiple viewpoint images of the subject are arranged as adjacent pixels in accordance with an arrangement of the viewpoints of the images, and outputting the synthesized three-dimensional image such that a stereoscopic image of the subject can be observed through an optical member having a cyclic structure superposed on the outputted three-dimensional image.

In a preferred form, the stereoscopic image forming method according to the ninth aspect further comprises evaluating the extracted parallax map.

To attain the above object, in a tenth aspect, the present invention provides a stereoscopic image forming program for causing an image forming method to be executed by a stereoscopic image forming apparatus comprising image acquiring means for acquiring an image of a subject as a subject image, parallax map acquiring means for acquiring a parallax map corresponding to the subject image acquired by the image acquiring means and representing a depth distribution of the subject, image processing means for subject image, and output means for outputting the three-dimensional image synthesized by the image processing means such that a stereoscopic image of the subject can be observed through an optical member having a cyclic structure superposed on the three-dimensional image, the program comprising a first module for finding viewpoint positions and pixel positions to which the multiple viewpoint image sequence belongs with respect to respective pixels of the three-dimensional image to be synthesized, a second module for finding a parallax deviation from the parallax map acquired by the parallax map acquiring means based on the viewpoint positions and the pixel positions acquired by the first module, a third module for finding pixels values of the subject image corresponding to the respective pixels of the stereoscopic image according to the parallax deviation acquired by the second module, and a fourth module for writing the pixel values of the image of the subject acquired by the third module into the respective pixels of the three-dimensional image.

To attain the above object, in an eleventh aspect, the present invention provides a stereoscopic image forming program for executing a stereoscopic image forming method that enables a stereoscopic image of a subject to be observed through an optical member having a cyclic structure by synthesizing multiple viewpoint images into a stereoscopic image, printing the stereoscopic image by printing means, and superposing the optical member on the printed stereoscopic image, the program comprising a synthesis module for dividing a three-dimensional image and synthesizing the divided three-dimensional images, and a control module for providing control such that the synthesized divided three-dimensional images are sequentially outputted to the printing means.

To attain the above object, in a twelfth aspect, the present invention provides a stereoscopic image forming program comprising a module for acquiring an image of a subject as a subject image, a module for acquiring a subject region from the subject image, a module for extracting a parallax map representing a depth distribution of the subject from the subject region, a module for generating multiple viewpoint images of the subject viewed from a plurality of viewpoints based on the subject image and the parallax map, a module for synthesizing a three-dimensional image such that pixels of same coordinates in respective ones of the multiple viewpoint images of the subject are arranged as adjacent pixels in accordance with an arrangement of the viewpoints of the images, and a module for outputting the synthesized three-dimensional image such that the synthesized three-dimensional image can be observed through an optical member having a cyclic structure superposed synthesized three-dimensional image.

To attain the above object, in a thirteenth aspect, the present invention provides a stereoscopic image forming program comprising a module for acquiring an image of a subject as an image of a subject, a module for storing at least one three-dimensional geometric model, a module for making the geometric model correspond to the subject image to acquire a three-dimensional form of the subject, a module for extracting a parallax map from the acquired three-dimensional form, a module for generating multiple viewpoint images of the subject viewed from a plurality of viewpoints based on the subject image and the parallax map, a module for synthesizing a three-dimensional image such that pixels of same coordinates in respective ones of the multiple viewpoint images of the subject are arranged as adjacent pixels in accordance with an arrangement of the viewpoints of the images, and a module for outputting the synthesized three-dimensional image such that a stereoscopic image of the subject can be observed through an optical member having a cyclic structure superposed on the outputted three-dimensional image.

The above and other objects, features and advantages of the present invention will become apparent from the following description taken in conjunction with the accompanying drawings.

DETAILED DESCRIPTION OF THE PREFERRED EMBODIMENTS

The present invention will now be described in detail with reference to the drawings showing preferred embodiments thereof.

First Embodiment

Figure 1:
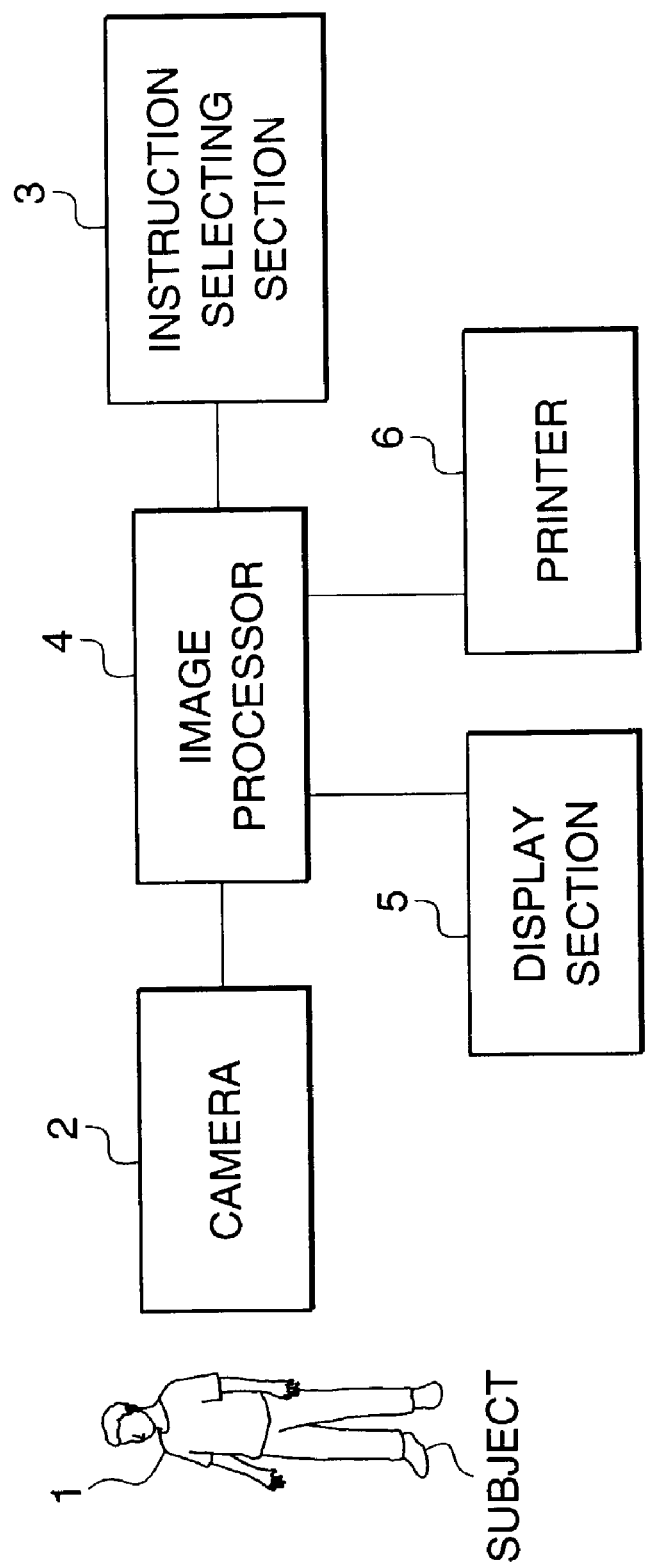
FIG. 1 is a block diagram showing the construction of a stereoscopic image forming apparatus according to a first embodiment of the present invention.

FIG. 1 is a block diagram showing the construction of a stereoscopic image forming apparatus according to a first embodiment of the present invention.

In FIG. 1, reference numeral 1 denotes a subject, and reference numeral 2 denotes a camera. The camera 2 is a digital camera "Power Shot S20 (trade name)" manufactured by Canon Inc., for example. Reference numeral 3 denotes an instruction selecting section such as a pointing device (mouse) and a keyboard, which provides interface between the apparatus and a user. Reference numeral 4 denotes an image processor having an information processing function, and reference numeral 5 denotes a display unit constituted by a CRT display or the like on which are displayed images and information related to processing. The instruction selecting section 3, image processor 4, and display section 5 are implemented by a general-purpose personal computer. Reference numeral 6 denotes a printer that is connected to the image processor 4 and is implemented by a printer "BJF850" (trade name) manufactured by Canon Inc., for example, that prints image data and the like generated by the image processor 4. The image processor 4, camera 2, and printer 6 are connected to each other via an interface such as a USB (Unversal Serial Bus).

A description will now be given of the operation of the stereoscopic image forming apparatus constructed as above.

First, an image of a subject shot by the camera 2 is captured into the image processor 4. Specifically, the image processor 4 boots up driver software for the camera 2, and performs predetermined processing to temporarily record image data of the subject shot by the camera 2 in a hard disk of the image processor 4 via the USB interface.

The image processor 4 then reads out the image from the hard disk to synthesize a stereoscopic image, and outputs the synthesized image to the printer 6. This sequence of processing is performed by the image processor 4 operating in accordance with application software. A description will now be given of a processing program executed by the image processor 4.

Figure 2:
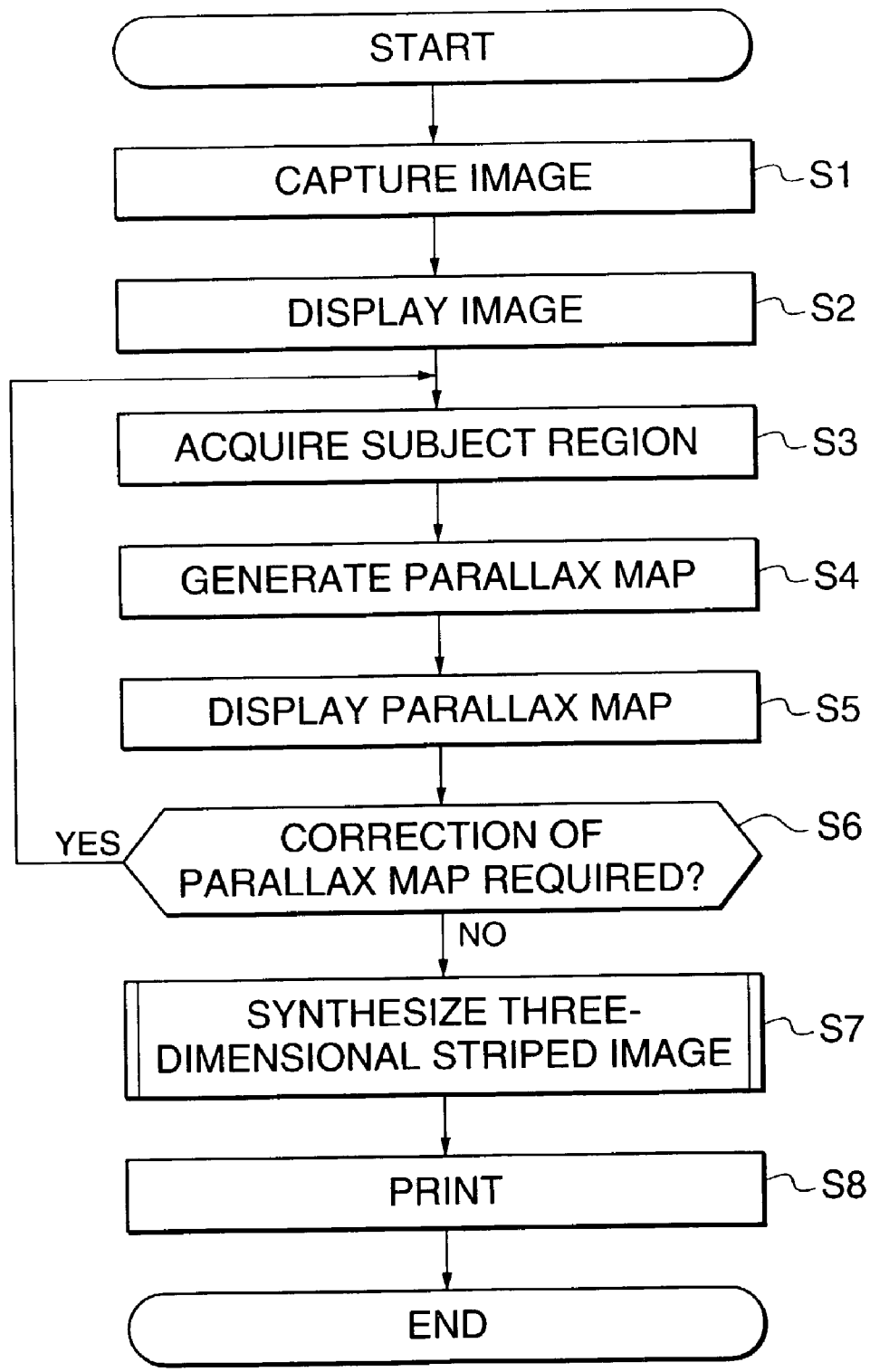
FIG. 2 is a flow chart showing a stereoscopic image forming process carried out by an image processor of the stereoscopic image forming apparatus according to the first embodiment.

FIG. 2 is a flow chart showing a stereoscopic image forming process carried out by the image processor 4.

First, in a step S1, an image of a subject shot by the camera 2 is captured into the hard disk of the image processor 4. On this occasion, a file name of image data or the like is designated using the instruction selecting section 3, and the designated file name is read into the program. At the same time, the image data is converted into two-dimensional array data or a bit map of RGB channels. Particularly, if the inputted image data is in JPEG image format, conversion of the image data such decompression of JPEG image is required because the image data can be directly processed with difficulty.

In the next step S2, an image is displayed on the display section 5 based on the image data captured in the step S1. On this occasion, a plain rectangular region is displayed to represent a predetermined sheet size, and the image is displayed inside this rectangular region. This enables the user to confirm the size and position of the image to be printed on a sheet.

A subject region is then acquired in a step S3. Specifically, the user specifies the subject region where a subject is to be displayed as a stereoscopic image so that he or she can feel as if the image were coming up close. For example, in the case of a scene in which a person is standing in front of the background, the user specifies a subject region along the outline of the person. Data of the subject region is stored in a memory as binary two-dimensional data in the same size as the image data with the specified subject region being expressed as 1 and the background being expressed as 0, for example.

In a step S4, a parallax map is then generated from the subject region specified in the step S3. The parallax map represents an amount of deviation between two views of the subject having corresponding pixels on a three-dimensional plane in the image data obtained by viewing the subject from two different viewpoints, that is, represents a depth distribution of the subject. The binary subject region data is subjected to filtering by a two-dimensional average filter of a predetermined size to generate two-dimensional real number array data constituting the parallax map. The average filter blurs the outline of the specified subject so that the user can feel as if the subject were gradually coming up close from the background without looking like a partition in the background.

In a step S5, the parallax map is displayed in a manner being superposed upon the image data. Specifically, the data of the parallax map is multiplied by pixel values of RGB components of the image data, and the resulting product values are displayed as the image data representing the parallax map.

In a step S6, the user checks a stereoscopic image to be produced with reference to the displayed parallax map. If the user determines that there is no necessity of correcting the parallax map since it is a desired one, he or she operates the instruction selecting section 3 to give an instruction for performing the next processing, and the process proceeds to a step S7. On the other hand, if the user determines that there is necessity of correcting the parallax map, he or she operates the instruction selecting section 3 to give an instruction for acquiring a subject region again, and the process returns to the step S3.

In the step S7, a three-dimensional striped image is directly synthesized from the image data (input image) acquired in the step S1 using the parallax map. The details of the step S7 will now be described with reference to FIG. 3.

Figure 3:
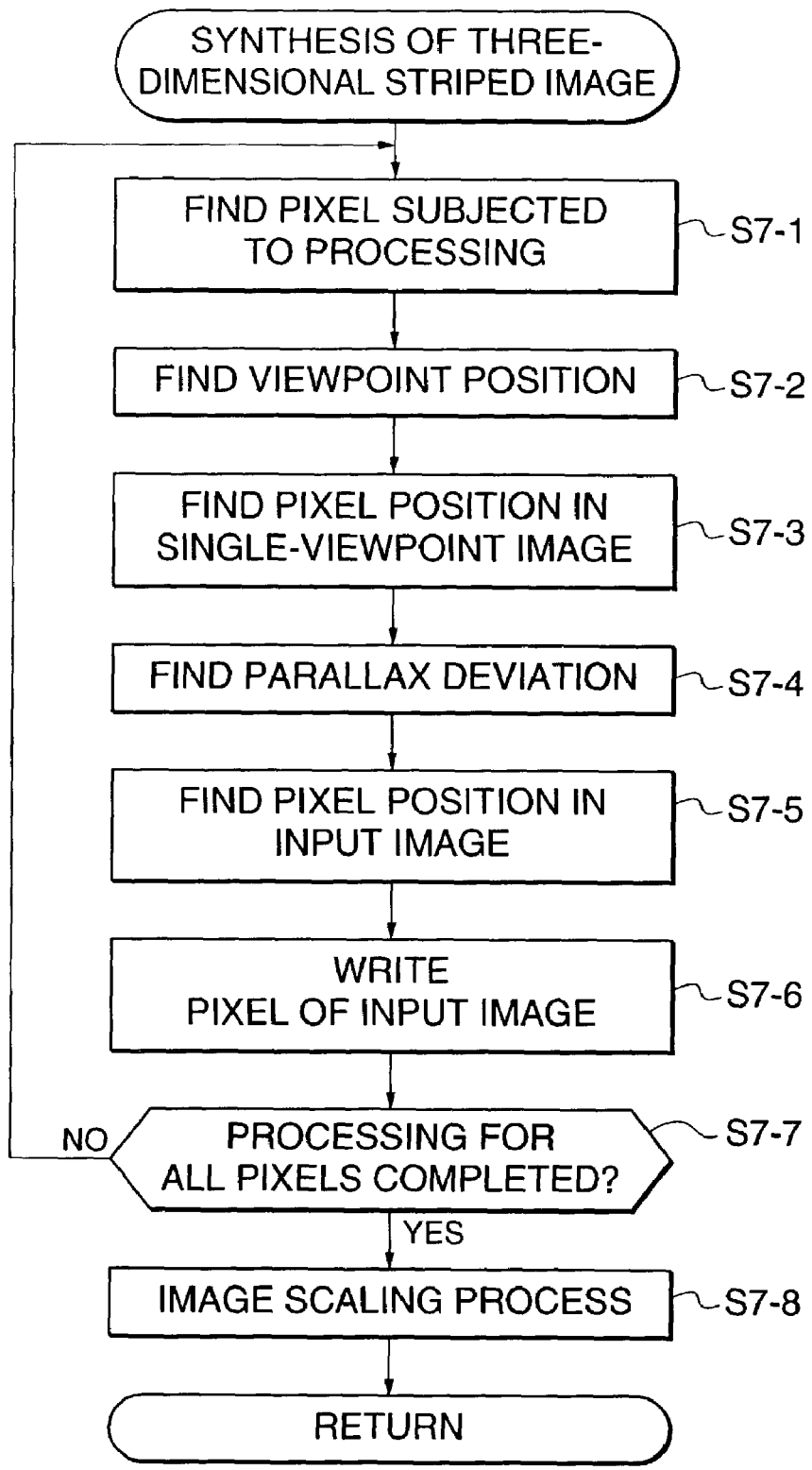
FIG. 3 is a flow chart showing the details of a step S7 in FIG. 2.

FIG. 3 is a flow chart showing the details of the processing in the step S7 of FIG. 2.

The step S7 comprises a first process (steps S7-1 to S7-7 in FIG. 3) in which the three-dimensional striped image, which is synthesized by rearranging multiple viewpoint images in the form of stripes, is directly synthesized from the input image by using the parallax map, and a second process (step S7-8 in FIG. 3) in which the three-dimensional striped image is enlarged or reduced so as to make the pitch thereof coincide with the pitch of a lenticular sheet and is outputted as a final three-dimensional striped image (hereinafter referred to as a "three-dimensional print image" so that it can be distinguished from the three-dimensional striped image).

First, in the processing from the step S7-1 to S7-7, pixel values at respective pixel positions of the three-dimensional striped image are found to synthesize the three-dimensional striped image. In the following description, the pixel position of the three-dimensional striped image to be found will be expressed as (ms, ns).

First, in the step S7-1 pixels to be subjected to processing are determined.

In the step S7-2, a viewpoint position to which the determined pixels to be subjected to processing belong is found according to the horizontal position of the pixel (horizontal pixel position) and the number of viewpoints. Specifically, a three-dimensional striped image is synthesized from a multiple viewpoint image sequence such that pixels of the same coordinates in respective images of the multiple viewpoint image sequence are arranged as adjacent pixels in accordance with the arrangement of the viewpoints of the images. Assuming that the value of any pixel at the jth viewpoint is expressed as $P_{jmn}$ (where m and n are indexes of a pixel array in the horizontal and vertical directions, respectively, of a single viewpoint image constituting the multiple viewpoint image sequence), image data at the jth viewpoint is expressed as the following two-dimensional array of pixels:

$$P_{j00}P_{j10}P_{j20}P_{j30}\ldots P_{j01}P_{j11}P_{j21}P_{j31}\ldots$$
$$P_{j02}P_{j12}P_{j22}P_{j32}\ldots$$

The synthesis of the three-dimensional image is carried out by decomposing the images at respective viewpoints into striped images in the vertical direction every pitch of the lenticular sheet, and synthesizing an image from the decomposed images corresponding to the number of the viewpoints in order reverse to the arrangement order of the viewpoint positions. Accordingly, the synthesized image is a striped image having a pixel array expressed as follows:

$$P_{N00}\ldots P_{200}P_{100}P_{N10}\ldots P_{210}P_{110}P_{N20}\ldots$$
$$P_{220}P_{120}\ldots P_{N01}\ldots P_{201}P_{101}P_{N11}\ldots$$
$$P_{211}P_{111}P_{N21}\ldots P_{221}P_{121}\ldots P_{N02}\ldots$$
$$P_{202}P_{102}P_{N12}\ldots P_{212}P_{112}P_{N22}\ldots P_{222}P_{122}$$

where N is the number of viewpoints, and the image at the first viewpoint becomes a left end image and the image at the Nth viewpoint becomes a right end image. The reason why the image is synthesized in order reverse to the arrangement order of the viewpoint positions is that, when the image is observed using a lenticular sheet, the image appears to be reversed in position in the left and right direction within one pitch of the lenticular sheet. Therefore, an index j representing the position of a viewpoint at a horizontal pixel position ms of the striped image is calculated according to the following equation (1):

$$j = N - \text{ms} \, \% \, N \qquad (1)$$

where % indicates a modulo operator.

In the next step S7-3, the pixel position in the single viewpoint image is found based on the number of viewpoints. The pixel position in a single viewpoint image corresponding to the pixel position (ms, ns) in the striped image is expressed as (ms/N, ns/N).

In the step S7-4, a parallax deviation at the pixel position (ms, ns) is calculated according to the pixel position of the single viewpoint image and the parallax map, based on the viewpoint position obtained in the step S7-2.

In calculating the parallax deviation, the viewpoint positions of the single viewpoint images constituting the multiple viewpoint image sequence are determined such that a predetermined parallax is obtained. If the parallax is too small, a degraded stereoscopic appearance would be obtained when observing a stereoscopic image.

Conversely, if the parallax is too large, a stereoscopic image with reduced sharpness would be observed due to cross talk between adjacent images.

The viewpoint positions are determined such that the viewpoints are arranged at regular intervals for the reasons as follows. By arranging the viewpoint positions at regular intervals in the image sequence, a stable stereoscopic image can be observed.

Further, the ratio between rise and fall of the perspective subject is adjusted to a predetermined value. Where the parallax found from the parallax map is represented by d, a range of generated parallaxes is expressed as (j×r) using the viewpoint index acquired in the step S7-2 (where r indicates a predetermined value representing the parallax range), and the adjustment in the perspective parallax is sh, the parallax deviation $\Delta$ is calculated according to the following equation (2):

$$\Delta = (j \times r) \times (d - sh) \qquad (2)$$

It should be noted that if a parallax at a location in the parallax map, which corresponds to the pixel position in the single viewpoint image, is directly used as the parallax deviation based on the viewpoint position, image deviation occurs in an image region where the parallax is greatly changed. The parallax map prepared in the step S4 represents the distribution of parallaxes corresponding to the respective pixels of the input image, and the single viewpoint image is considered to be one of images modified from the input image using the parallax map. It is therefore necessary to correct the pixel position in the single viewpoint image by the parallax deviation in order to obtain a parallax deviation corresponding to the pixel position in the single viewpoint image from the parallax map.

Therefore, according to the present embodiment, a parallax deviation at a pixel position after modification of the input image by the parallax deviation is estimated by interpolation using a first parallax deviation calculated according to the above equation (2) based on a parallax from the parallax map corresponding to the pixel position in the single viewpoint image and the viewpoint index, and a second parallax deviation calculated according to the above equation (2) based on a parallax from the parallax map corresponding to a pixel position obtained by correcting the pixel position in the single viewpoint image by the first parallax deviation. It should be noted that any other method may be used to estimate the parallax deviation at the pixel position of the single viewpoint image modified by the parallax deviation.

In the next step S7-5, a pixel position in the input image is found according to the pixel position in the single viewpoint image obtained in the step S7-3 and the parallax deviation obtained in the step S7-4.

In the next step S7-6, a pixel value corresponding to the pixel position in the input image is acquired from the input image, and is written into the pixel at the position (ms, ns) in the three-dimensional striped image. Incidentally, to find the pixel value corresponding to the pixel position in the real number coordinates of the input image, the pixel value is calculated by bilinear interpolation, for example.

It is then determined in the step S7-7 whether the processing from the step S7-1 through the step S7-6 has been completed for all pixels of the three-dimensional striped image. If the determination result is negative, the process returns to the step S7-1, and if the determination result is positive, the process proceeds to the step S7-8.

As described above, by repeating the processing from the step S7-1 through the step S7-7 for all pixels of the three-dimensional striped image, a stereoscopic strip image can be synthesized directly from the input image using the parallax map without the necessity of synthesizing the three-dimensional strip image from the multiple viewpoint image sequence as in the prior art.

In the step S7-8, the three-dimensional strip image synthesized in the steps S7-1 to S7-7 is enlarged or reduced so as to make the pitch thereof coincide with the pitch of the lenticular sheet, and is outputted as a stereoscopic print image. The enlargement or reduction of the three-dimensonal strip image is carried out by bilinear interpolation, for example.

The size of the three-dimensional strip image generated in the step S7 depends on the print resolution and the print size. Assuming that the resolution of the printer 6 is RPdpi (dot per inch) and the print size is (XP×YP) inches, the size of the printed image X is (X(=RP×XP)×Y(=RP×YP) pixels.

The size of the stereoscopic strip image synthesized in the steps S7-1 to S7-7 is ((N×UX)×UY) pixels where the size of each single viewpoint image constituting the multiple viewpoint image sequence is expressed as (UX×UY) pixels and the number of multiple viewpoint images (=the number of viewpoints) is expressed as N.

The horizontal size of the three-dimensional striped image synthesized in the step S7-8 is X pixels to match the number of dots in the printer 6 with the pitch of the lenticular sheet since the print image is comprised of (UX×RP×RL) pixels where the pitch of the lenticular sheet is expressed as RL inches. Thus, the horizontal size UX of the single viewpoint image is expressed as (X/(RP×RL) ) pixels. On this occasion, there is some error since the size of the image is actually an integer.

The vertical size of each single viewpoint image may be equal to the vertical size Y of the printed image. However, to reduce the time required for synthesizing the three-dimensional striped image in the steps S7-1 to S7-7, the vertical size of the single viewpoint image is preferably equal to the vertical size of the input image in the case where the vertical size of the input image is smaller than the size of the printed image. For example, if the resolution of the printer 6 is 600 dpi and the print size is 4×3 inches, the size of a three-dimensional striped image to be synthesized is 2400×1800 pixels. If the size of the input image is 800×600 pixels, the number of images is 12, and the pitch of the lenticular sheet is (1/50. 8) inches, the size of each single viewpoint image is 203×600 pixels, the size of the three-dimensional striped image to be synthesized in the steps S7-1 to S7-7 is 2436×600 pixels, and the size of the three-dimensional print image to be synthesized in the step S7-8 is 2398×1800 pixels. Thus, it is possible to synthesize the three-dimensional striped image in a size substantially equal to a desired print size although there is some error in the horizontal size since the pitch of the three-dimensional striped image is made to coincide with that of the lenticular sheet.

According to the present embodiment, the image memory capacity can be reduced by twelve single viewpoint images in the size of 203×600 pixels as compared with the prior art.

Referring again to FIG. 2, the output image obtained in the step S7 is printed in a step S8. A stereoscopic image can be observed through the lenticular sheet superposed on the printed image.

As described above, according to the present embodiment, it is possible to synthesize a three-dimensional striped image directly from the input image using the parallax map without the necessity of generating multiple viewpoint images as is the case with the prior art, and this saves the image memory capacity by an amount of storing the multiple viewpoint images.

Moreover, there is no necessity of temporarily storing the multiple viewpoint images and then reading them out as is the case with the prior art, and this reduces the time required for processing.

Second Embodiment

A description will now be given of a second embodiment of the present invention.

A stereoscopic image forming apparatus according to the second embodiment is adapted to shoot stereo images of a subject viewed from two viewpoints at the right and left by a camera on which is mounted a stereophotographing adapter, synthesizes a three-dimensional striped image from the stereo images to acquire a print image that is observed through a lenticular sheet.

Figure 4:
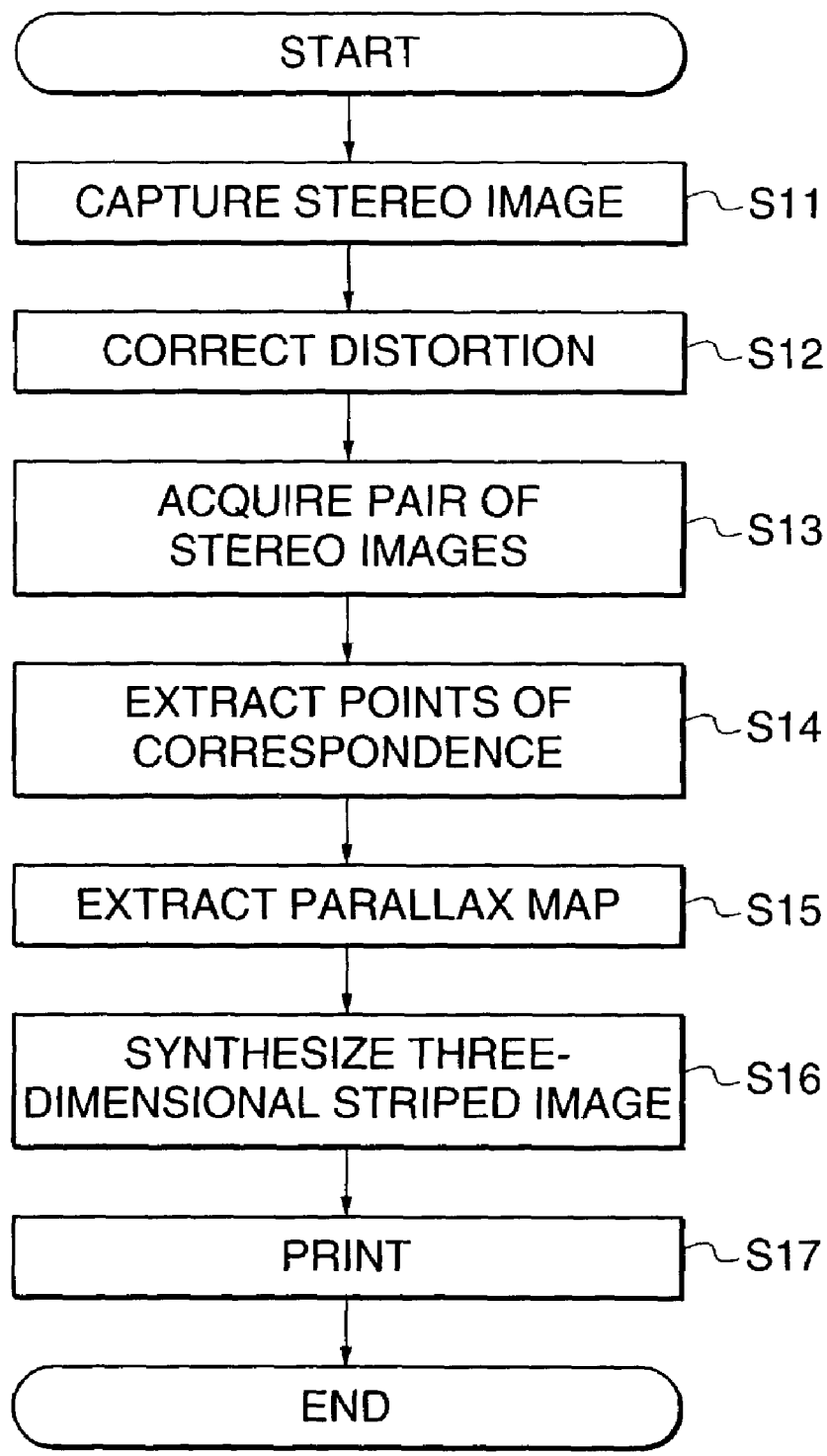
FIG. 4 is a flow chart showing a stereoscopic image forming process carried out by an image processor according to a second embodiment of the present invention.

FIG. 4 is a flow chart showing a stereoscopic image forming process carried out by the stereoscopic image forming apparatus according to the second embodiment.

Stereo images of a subject are shot from two viewpoints at the right and left by the camera on which is mounted the stereophotographing adapter and the stereo images are captured (step S11). The captured stereo images are corrected for distortion (step S12). A pair of stereo images are then acquired (step S13), and points of correspondence in the pair of stereo images are extracted (S14). A parallax map is extracted based on the extracted points of correspondence (step S15). A three-dimensional striped image is synthesized from an input image that is one of the stereo images acquired in the step S13, using the parallax map extracted in the step S15 (step S16). In the step S16, the same processing is executed as in the step S7 shown in FIG. 2. Finally, the three-dimensional striped image synthesized in the step S16 is printed.

According to the second embodiment, as is the case with the first embodiment, it is possible to synthesize a three-dimensional striped image directly from stereo images using the parallax map without the necessity of generating multiple viewpoint images as is the case with the prior art, and this saves the image memory capacity by an amount of storing the multiple viewpoint images. Moreover, there is no necessity of temporarily storing the multiple viewpoint images and then reading them out as in the prior art, and this reduces the time required for processing.

Other Embodiments

Although in the above described embodiments, the present invention is applied to the stereoscopic image forming apparatus using the lenticular sheet, the present invention may be applied to a stereoscopic image forming apparatus based on the integral photography or the barrier method.

Further, although in the above described embodiments, the stereoscopic image is finally outputted from the printer, the present invention may be applied to an apparatus that displays a stereoscopic image on a so-called auto stereoscopic display, which is constituted by a liquid crystal display or the like to which is attached a lenticular sheet.

It is to be understood that the object of the present invention may also be accomplished by supplying a system or an apparatus with a storage medium in which a program code of software which realizes the functions of the above described embodiments is stored, and causing a computer (or CPU or MPU) of the system or apparatus to read out and execute the program code stored in the storage medium.

In this case, the program code itself read from the storage medium realizes the functions of the embodiments described above, and hence the storage medium on which the program code is stored constitutes the present invention.

Examples of the storage medium for supplying the program code include a floppy (registered trademark) disk, a hard disk, an optical disk, a magneto-optical disk, a CD-ROM, a CD-R, a CD-RW, a DVD-RW, a DVD+RW, a magnetic tape, a nonvolatile memory card, and a ROM.

Moreover, it also goes without saying that the functions of the embodiments described above may be realized not necessarily by causing the computer to read and execute the program code, but alternatively by causing an operating (OS) system running on the computer to perform part or all of the actual processing based on instructions in the program code.

Furthermore, it also goes without saying that the functions of the above described embodiments above may be realized by writing the program code read from the storage medium into a memory provided on a function expansion board inserted into the computer or in a function expansion unit connected to the computer, and then causing a CPU or the like provided on the function expansion board or in the function expansion unit to perform part or all of the actual processing based on instructions in the program code.

As described above in detail, the stereoscopic image forming apparatus according to the present embodiment in which a stereoscopic image is synthesized from multiple viewpoint images and printed, and a subject can be observed as a stereoscopic image with an optical member such as a lenticular sheet superposed on the printed image, is characterized in that a three-dimensional striped image is synthesized directly from an input image using a parallax map without generating the multiple viewpoint images.

This reduces the image memory capacity required for synthesizing the three-dimensional striped image, and reduces the time required for synthesizing the three-dimensional striped image.

Third Embodiment

A description will now be given of a third embodiment of the present invention. The present assignee has already proposed an image forming method that comprises acquiring a pair of stereo images of a subject shot from two viewpoints at the right and left by a camera on which is mounted a stereophotographing adaptor, and obtaining multiple viewpoint images from the stereo images by electronic interpolation to thereby form a stereoscopic image (refer to Japanese Laid-Open Patent Publication (Kokai) No. 2001-346226). Since the three-dimensional image has information on images from many viewpoints, a larger image memory capacity is required than in the case where an ordinary two-dimensional image is printed.

The third embodiment as described below provides a stereoscopic image forming method that can greatly reduce the image memory capacity required for printing a three-dimensional image. This method, which comprises synthesizing a stereoscopic image from multiple viewpoint images, printing the synthesized image by printing means, and enabling a stereoscopic image of the subject to be viewed by placing an optical member having a cyclic structure on the printed stereoscopic image, is characterized by comprising a control step of providing control such that a three-dimensional image is divided and the divided images are synthesized and sequentially outputted by the printer.

A description will now be given of the third embodiment with reference to the drawings.

The arrangement of a stereoscopic image forming system according to the third embodiment is identical with that of the first embodiment shown in FIG. 1, and a description thereof is omitted herein.

The camera 2 shoots a subject from a plurality of different viewpoints to acquire multiple viewpoint images. The image processor 4 synthesizes a stereoscopic image from the multiple viewpoint images and outputs it to the printer 6.

A description will now be given of the operation of the stereoscopic image forming system according to the third embodiment, which is constructed in the above-mentioned manner.

First, a plurality of images (multiple viewpoint images) obtained by the camera 2 shooting a subject from a plurality of viewpoints are captured into the image processor 4. Data of the images of the subject shot and recorded by the camera 2 is subjected to predetermined processing by driver software for the camera 2 actuated in a personal computer (PC) as the image processor 4 and the processed data is temporarily stored in a hard disk of the PC via the USB interface.

The image processor 4 synthesizes a three-dimensional image from the images thus captured into the image processor 4, and outputs it to the printer 6.

Figure 5:
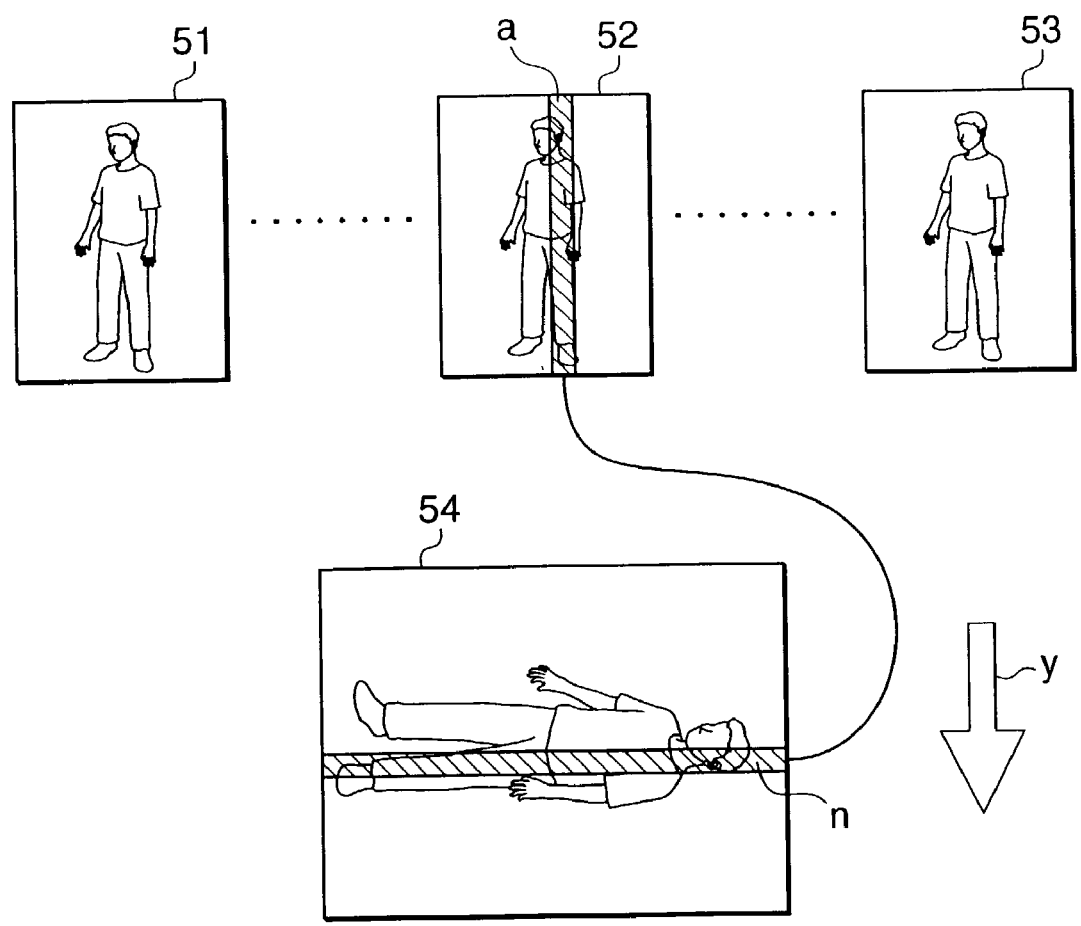
FIG. 5 is a view useful in explaining a three-dimensional image synthesizing method executed by a stereoscopic image forming system according to a third embodiment of the present invention.

FIG. 5 is a diagram conceptually showing how the three-dimensional image is synthesized according to the present embodiment. In FIG. 5, reference numerals 51, 52, and 53 denote single viewpoint images constituting multiple viewpoint images, and reference numeral 54 denotes the synthesized three-dimensional image. In the present embodiment, image data at respective lines of the three-dimensional image 54 are sequentially generated with reference to the multiple viewpoint images as input images, and outputted to the printer 6. Specifically, as shown in FIG. 5, an image region indicated by diagonal lines a in an image of the single viewpoint image 51, 52 or 53 from a predetermined viewpoint corresponding to each row of the three-dimensional image 54 indicated by diagonal lines n is found to generate image data of one row of the three-dimensional image 54. The generated image data are sequentially printed by the printer 6. The sequence of processing is executed in accordance with PC application software, for example. Although in the example of FIG. 5, an image region at each row in the single viewpoint image 51, 52, or 53 is found to generate image data of one row of the three-dimensional image 54, the gist of the present invention encompasses an embodiment in which division of a three-dimensional image to be synthesized is carried out every line, and therefore in the following description and appended claims the term "line" includes "row" unless otherwise specified.

A description will now be given of a processing program executed by the image processor 4 with reference to FIG. 6.

Figure 6:
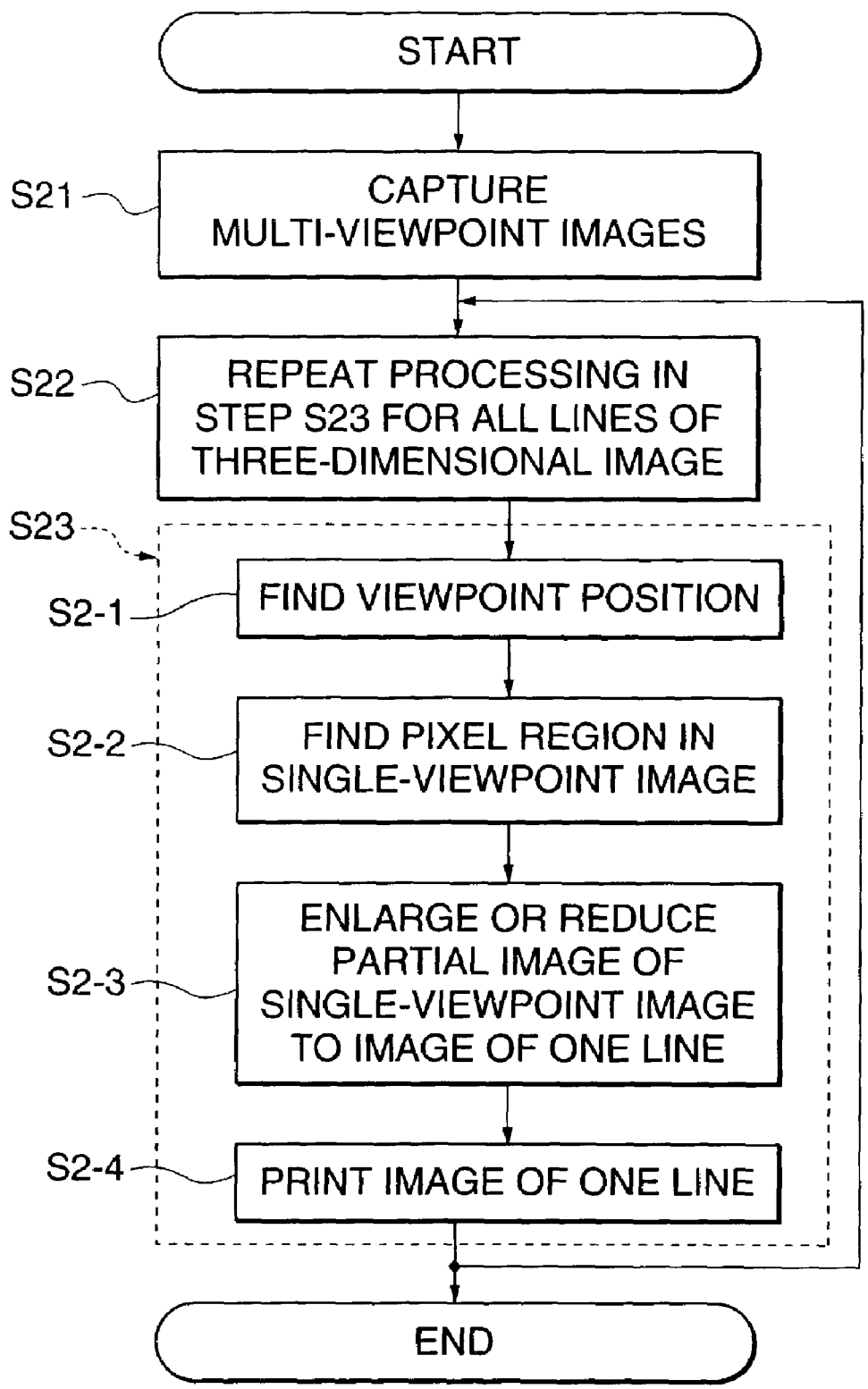
FIG. 6 is a diagram showing an algorithm of a processing program executed by an image processing means of the stereoscopic image forming system according to the third embodiment.

FIG. 6 shows an algorithm of the processing program executed by the stereoscopic image forming system according to the present embodiment.

In FIG. 6, first in a step S21, the multiple viewpoint images of the subject shot by the camera 2 are captured into a memory of the PC as the image processor 4 to convert the multiple viewpoint images into data capable of being handled by the processing program. On this occasion, a file name of the image data or the like is designated using the instruction selecting section 3, and the designated file name is read into the program. At the same time, the image data is converted into two-dimensional array data or a bit map of RGB channels.

In the next step S22, processing in a step S23 is repeated for all lines of the three-dimensional image 54 that is to be generated and outputted, and the image data are sequentially outputted line by line to the printer 6.

A description will now be given of an example in which the nth line of the three-dimensional image 54 is processed in the step S23.

First, in a step S2-1, a viewpoint position to which the nth line belongs is found according to the number of the line and the number of viewpoints. Specifically, each of the single viewpoint images 51, 52, and 53 from which the three-dimensional image 54 is to be synthesized is decomposed into striped images every row in the left and right direction of the images and the decomposed striped images are arranged in a number corresponding to the number of viewpoints in order reverse to that of the arrangement of the viewpoint positions such that pixels of the same coordinates in the single viewpoint images 51, 52, and 53 are arranged as adjacent pixels in accordance with the arrangement of the viewpoints of the images.

The reason why the decomposed striped images are arranged in order reverse to that of the arrangement of the viewpoint positions is that when the image is observed using a lenticular sheet as an optical member, the image appears to be reversed in position in the left and right direction within one pitch of the lenticular sheet. Pixels corresponding in number to the number of viewpoints are printed within one pitch of the lenticular sheet. The printing of the three-dimensional image 54 is carried out in the lenticular sheet repeating direction (horizontal direction during observation) as the main scanning direction (direction indicated by the arrow y in FIG. 5), so that images are sequentially generated and outputted line by line in the vertical direction of the images (refer to FIG. 5).

Here, provided that the number of viewpoints is represented by N and j by an index representing the viewpoint position, the index j is calculated according to the following equation (3):

$$j = N - n \% N \quad (3)$$

where the operator % is a modulo operator.

In the next step S2-2, a rectangular image region in the single viewpoint image 51, 52, or 53 corresponding to a line of the three-dimensional image to be found, which corresponds to the viewpoint index j obtained in the step S2-1, is found. Specifically, an image region at one row in the single viewpoint image 51, 52, or 53 corresponding to the nth image region in one line of the three-dimensional image 54 is found.

In the next step S2-3, image data of the image region found in the step S2-2 is enlarged or reduced to generate image data of one line of the three-dimensional image 54.

In the next step S2-4, the image data of one line generated in the step S2-3 is outputted to the printer 6.

As described above, in the step S22, the processing from the step S2-1 to S2-4 of the step S23 is repeated for all lines of the three-dimensional image 54, so that data of all images constituting the three-dimensional image 54 are sequentially outputted to and printed by the printer 6.

The present process is terminated after in the step S22, the processing from the step S2-1 to S2-4 in the step S23 has been repeated for all lines of the three-dimensional image 54.

By superposing the lenticular sheet on the image printed by the above processing, a stereoscopic image can be observed.

According to the present embodiment, the three-dimensional image 54 is divided every line and the divided images are sequentially printed by the printer 6. Therefore, it is sufficient to provide an image memory for storing the multiple viewpoint images for use as the input images and an image memory for storing image data of one line of the three-dimensional image 54 to be printed. This greatly reduces the image memory capacity as compared with the prior art.

In the present embodiment, the pixels corresponding in number to the number of viewpoints are printed within one pitch of the lenticular sheet. In this connection, in the case that the pitch of the pixels corresponding in number to the number of viewpoints to be printed and the pitch of the lenticular sheet do not coincide with each other, the three-dimensional image 54 has to be enlarged or reduced for pitch adjustment before printing.

Referring to FIGS. 5 and 6, a description will now be given of the case where the present embodiment is applied to a method of enlarging or reducing the three-dimensional image 54 by generating image data of one line through interpolation of image data of two lines before the pitch adjustment.

First, two lines of the three-dimensional image are selected for enlargement or reduction for pitch adjustment, for each line of the three-dimensional image 54 after the pitch adjustment. The viewpoint positions of the respective lines are found in the step S2-1 and the image regions of the respective lines are found in the step S2-2. The image data is enlarged or reduced into an image of one line in the next step S2-3 to generate image data of two lines. In the next step S2-4, the image data of two lines are subjected to interpolation to generate three-dimensional image data of one line to be printed, and the three-dimensional image data thus generated are outputted line by line to the printer 6.

Fourth Embodiment

Next, a description will now be given of a fourth embodiment of the present invention with reference to FIGS. 7 and 8. The basic construction of the fourth embodiment is identical with the one in FIG. 1 showing the first embodiment, and thus, FIG. 1 will be referred to as the need arises in the following description.

In the above described third embodiment, the printing of the three-dimensional image is sequentially carried out with the lenticular sheet repeating direction as the main scanning direction, but in the fourth embodiment, the printing of the three-dimensional image is sequentially carried out with a direction vertical to the lenticular sheet repeating direction as the main scanning direction.

Figure 7:
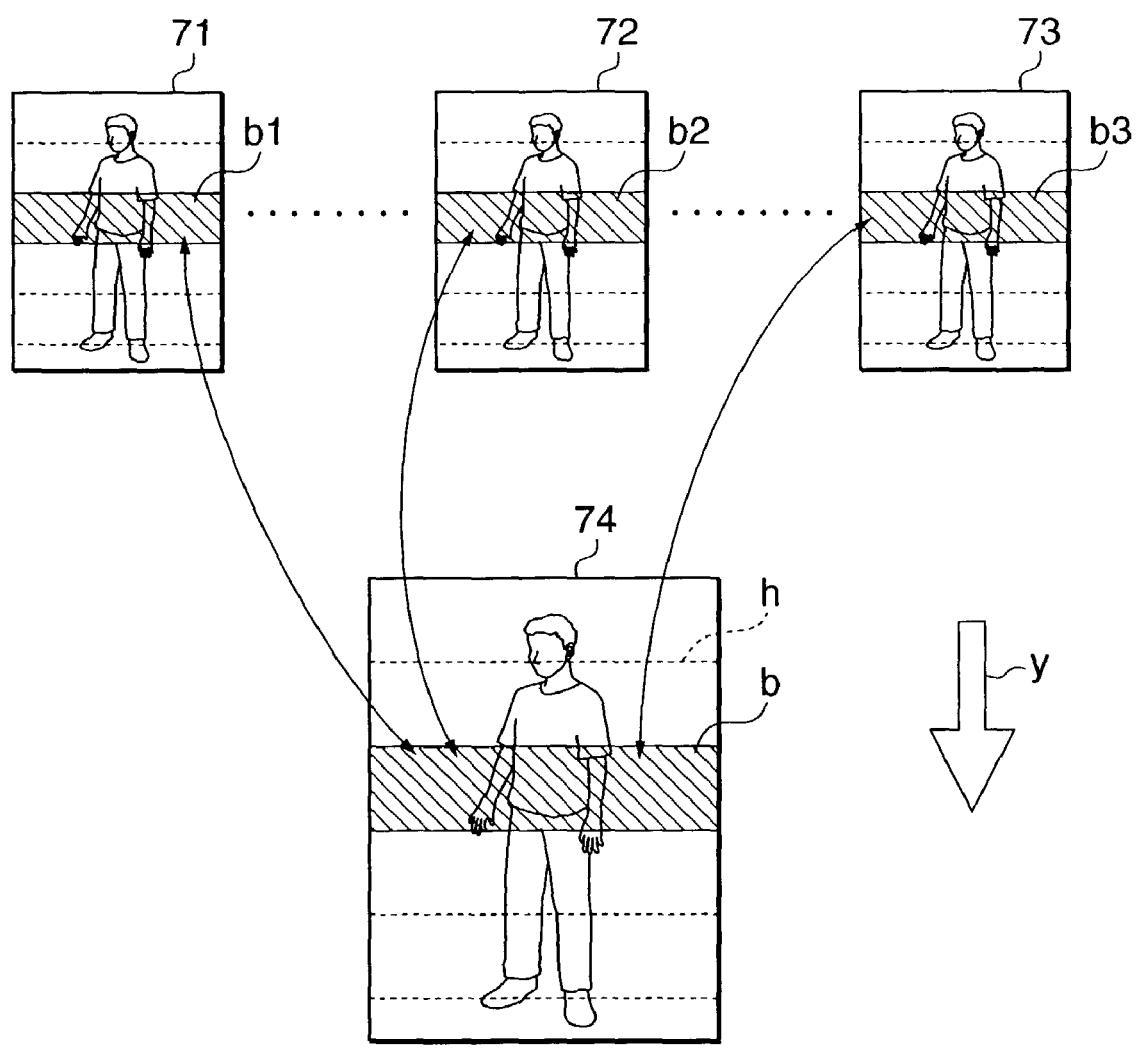
FIG. 7 is a diagram useful in explaining a method of synthesizing a three-dimensional image by a stereoscopic image forming system according to a fourth embodiment of the present invention.

FIG. 7 conceptually shows how a three-dimensional image is synthesized in a stereoscopic image forming system according to the present embodiment. In FIG. 7, elements and parts corresponding to those in FIG. 5 are denoted by the same reference numerals.

In FIG. 7, broken lines h indicate the state in which a three-dimensional image 74 is divided into a plurality of blocks, diagonal lines b indicate one of the blocks, and diagonal lines b1, b2, and b3 indicate rectangular image regions in single viewpoint images 71, 72, and 73, respectively, corresponding to the diagonal lines b.

In the present embodiment, the image regions b1, b2, and b3 in the single viewpoint images 71, 72, and 73 corresponding to respective blocks of the three-dimensional image 74 are found so that the three-dimensional image 74 are generated in a plurality of blocks and printed. Image data of the respective blocks of the three-dimensional image 74 are generated from the image data of the image regions b1, b2, b3 in the single viewpoint images 71, 72, 73, and are sequentially printed by the printer 6.

Figure 8:
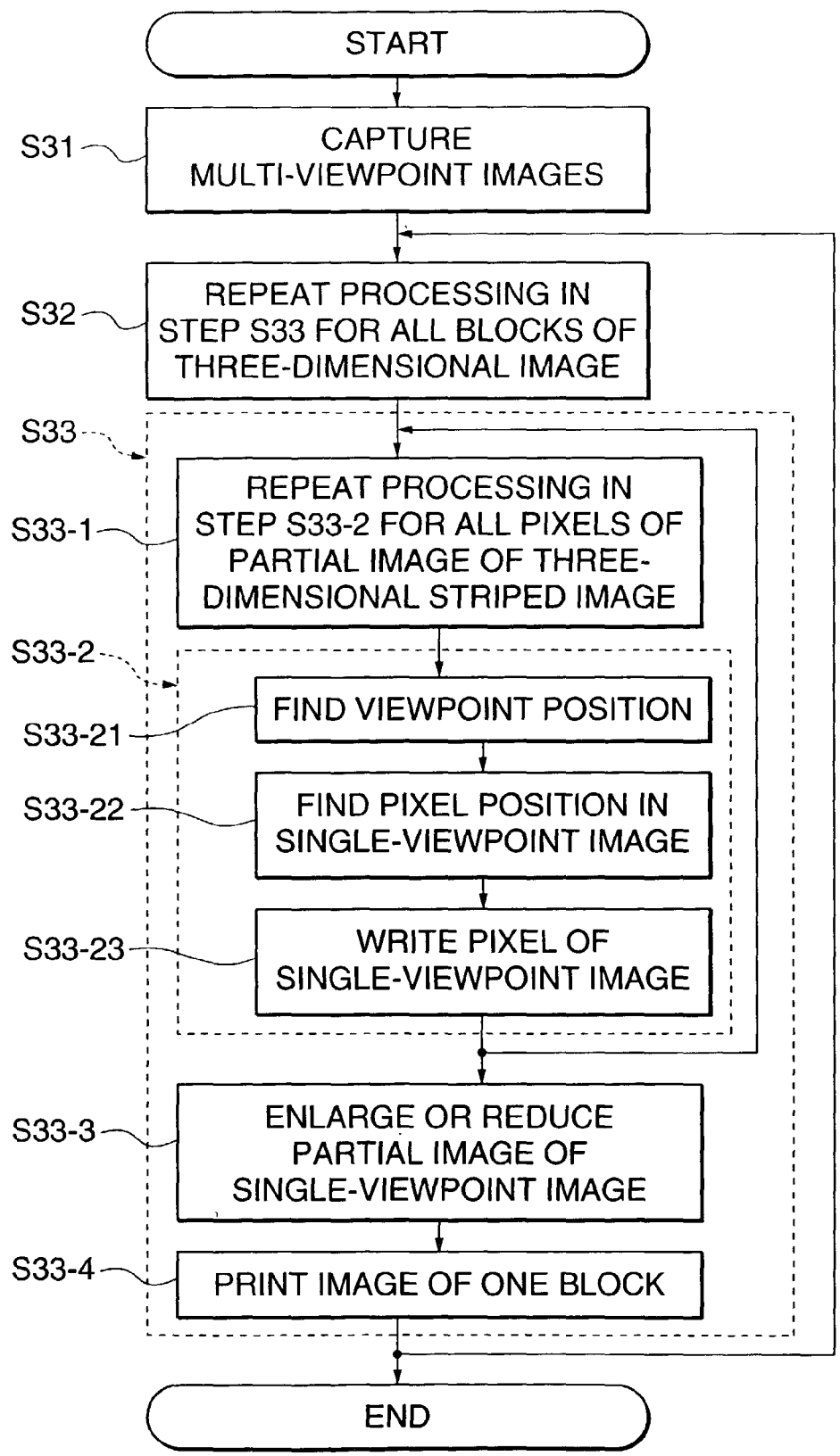
FIG. 8 is a diagram showing an algorithm of a processing program executed by an image processing means of the stereoscopic image forming system according to the fourth embodiment.

Referring next to FIG. 8, a description will be given of a method of performing the above-mentioned sequence of processing in accordance with PC application software.

It should be noted that in the present embodiment it is assumed that a three-dimensional striped image synthesized from the single viewpoint images 71, 72, and 73 is enlarged or reduced to make the pitch thereof coincide with the pitch of the lenticular sheet, and is printed as the three-dimensional image 74.

FIG. 8 is a diagram showing an algorithm of a processing program executed by the stereoscopic image forming system according to the present embodiment.

First, in a step S31, the same processing is performed as in the step S21 in FIG. 6. Specifically, multiple viewpoint images of the subject shot by the camera 2 are captured into the memory of the PC as the image processor 4 so that they can be converted into data capable of being handled by a processing program.

In the next step S32, processing in a step S33 is repeated for all blocks of the three-dimensional image that is to be generated and outputted, and image data of the respective blocks are sequentially outputted to the printer 6.

The details of the processing in the step S33 will now be described in detail.

First, three-dimensional striped images of lines corresponding to each block of the three-dimensional image 74 are generated in a step S33-1. Specifically, partial image regions of three-dimensional striped images corresponding to each block of the entire three-dimensional image are found, and pixels of the partial image regions are repeatedly found in the next step S33-2.

The details of the processing in the step S33-2 will now be described in detail.

First, a viewpoint position to which pixels of the three-dimensional striped image belong is found according to the pixel positions and the number of viewpoints. In the present embodiment, the three-dimensional striped image is synthesized in basically the same manner as in the above described first embodiment, and each of the single viewpoint images 71, 72, and 73 from which the three-dimensional image 74 is to be synthesized is decomposed into striped images every line in the vertical direction of the images and the decomposed striped images are arranged in a number corresponding to the number of viewpoints in order reverse to that of the arrangement of the viewpoint positions such that pixels of the same coordinates in the single viewpoint images 71, 72, and 73 are arranged as adjacent pixels in accordance with the arrangement of the viewpoints of the images.

The three-dimensional striped image is printed with a direction vertical to the lenticular sheet repeating direction (i.e. the vertical direction during observation as indicated by an arrow y in FIG. 7) as the main scanning direction (see FIG. 7).

In the next step S33-22, pixel positions corresponding to the pixels of the three-dimensional striped image acquired from the single viewpoint image 71, 72, or 73 on the step S33-22 are found correspondingly to the viewpoint index found in the step S3-21.

In the next step S33-23, pixel values at the pixel positions found in the step S33-22 in the single viewpoint images 71, 72, or 73 at the viewpoint position found in the step S33-21 are found, and are written into the pixels at the pixel positions of the three-dimensional striped image. On this occasion, the pixel values corresponding to the pixel positions of the real number coordinates in the single viewpoint images 71, 72, and 73 are acquired by bilinear interpolation, for example.

As described above, the processing from the step S33-21 to S33-23 is repeated for the corresponding image regions of interest in the three-dimensional striped image to thus acquire a partial image of the three-dimensional striped image.

In the next step S33-3, the partial image of the three-dimensional striped image acquired in the step S33-2 is enlarged or reduced to make the pitch thereof coincide with the pitch of the lenticular sheet to acquire image data of one block of the three-dimensional image to be printed.

In the next step S33-4, the image data of one block generated in the step S33-3 is outputted to the printer 6.

The processing from the step S33-1 to step S33-3 is repeated for all blocks of the three-dimensional image 74, so that the data of all images of the three-dimensional image are sequentially outputted to the printer 6 and printed as the three-dimensional image 74.

In the step S32, the process is terminated after the processing from the step S33-1 to step S33-4 has been repeated for all blocks of the three-dimensional image.

The above described processing enables observation of a stereoscopic image through the lenticular sheet superposed on the printed image as is the case with the first embodiment, and greatly reduces the image memory capacity required for printing.

It goes without saying that although in the above described third and fourth embodiments, the images inputted in the step S21 in FIG. 6 and the step SS31 in FIG. 8 are used as multiple viewpoint images of one subject viewed from different viewpoints, the present invention may be applied to formation of a so-called changing image by inputting different images of different subjects or moving images of one subject.

Fifth Embodiment

A description will now be given of a fifth embodiment of the present invention with reference to FIGS. 9A and 9B.

The basic construction of a three-dimensional image processing system according to the present embodiment is identical with the one in FIG. 1 showing the first embodiment, and thus, FIG. 1 will be referred to as the need arises in the following description.

In the above described third and fourth embodiments, the present invention is applied to the method in which the three-dimensional striped image is synthesized from the multiple viewpoint images and is printed, but in the present embodiment, the present invention is applied to a method in which a three-dimensional image is generated based on one image and is printed.

It should be noted that in the present embodiment, the three-dimensional image is printed in the same direction as in the second embodiment. Further, in the following description, reference is again made to FIG. 7 showing a method of synthesizing a three-dimensional image.

Figure 9A:
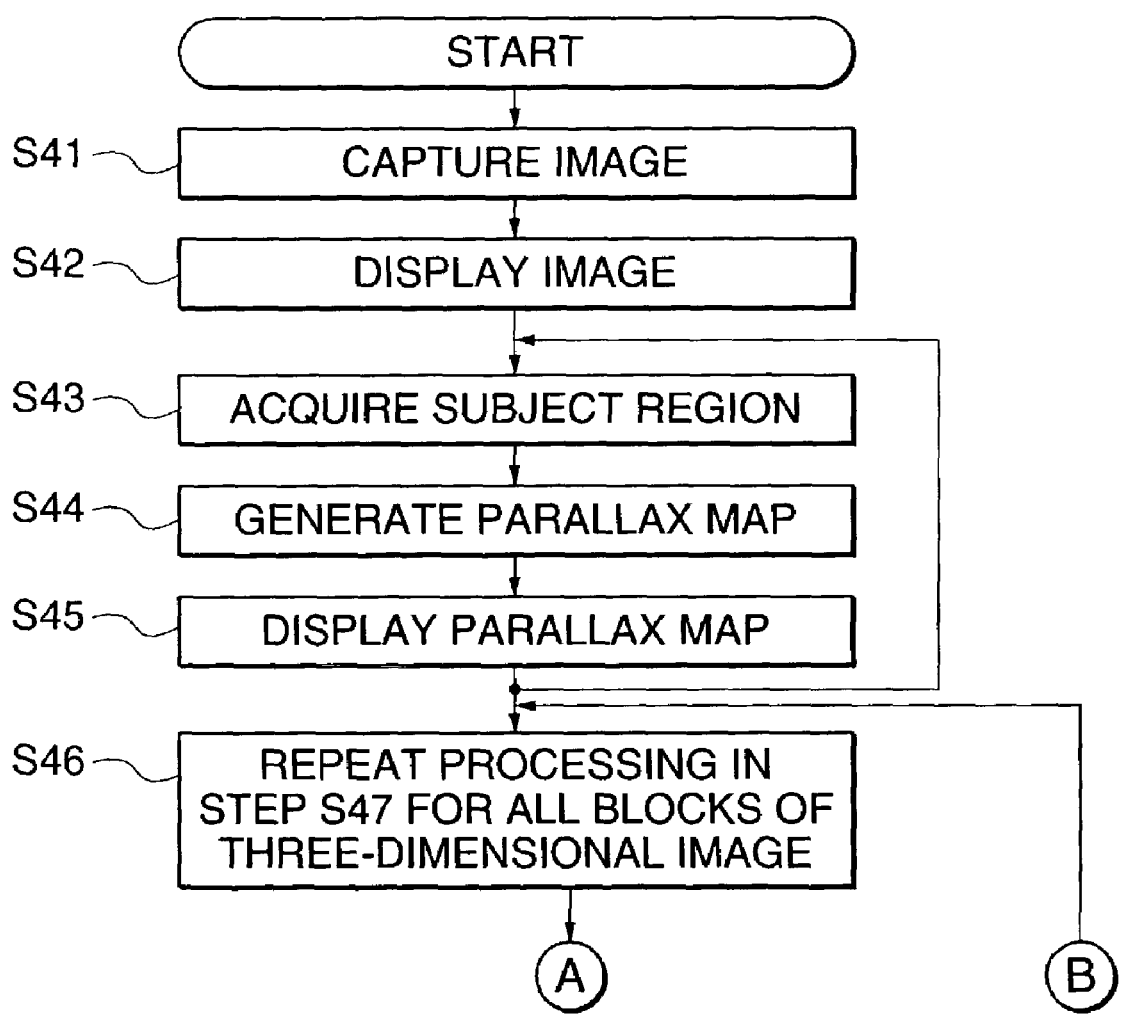
FIGS. 9A and 9B is a diagram showing an algorithm of a processing program executed by an image processing means of the stereoscopic image forming system according to a fifth embodiment of the present invention.
Figure 9B:
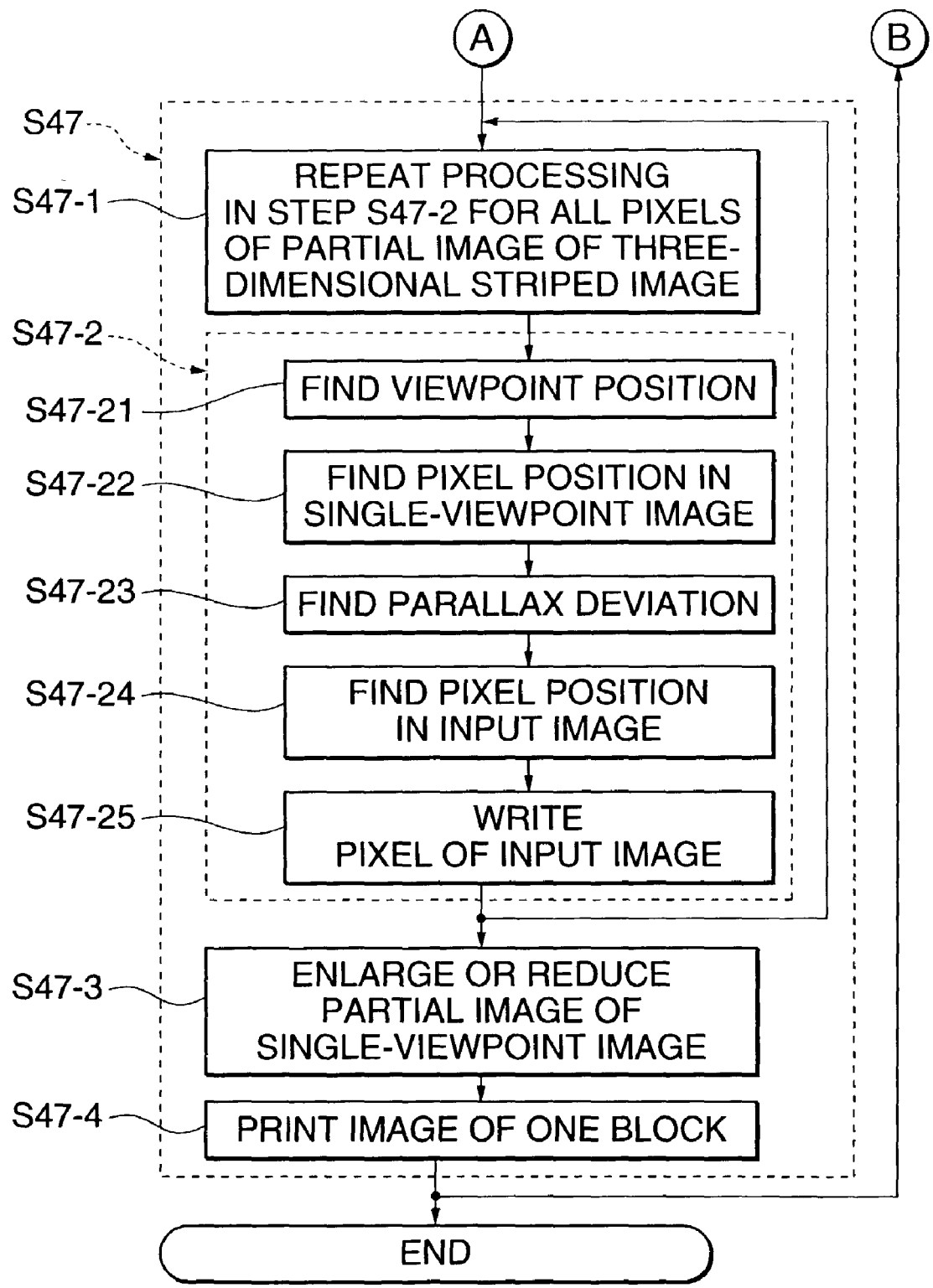

FIGS. 9A and 9B shows an algorithm of a processing program executed by the three-dimensional image forming system according to the present embodiment.

It should be noted that steps S46, S47-1, S47-3, S47-4, S47-21, and S47-22 in FIGS. 9A and 9B are identical with the steps S32, S33-1, S33-3, S33-4, S33-21, S33-22, respectively in FIG. 8 showing the fourth embodiment. Therefore, a description thereof is omitted herein, and only process steps specific to the present embodiment will be described below.

In FIGS. 9A and 9B, first in a step S41, an image of a subject shot by the camera 2 is captured into the memory of the PC as the image processor 4 so that the image can be converted into data capable of being handled by the processing program.

In the next step S42, the image data captured in the step S41 is displayed on the display section 5.

A region of the subject 1 is then acquired in a step S43. Specifically, the user specifies the region of the subject 1 where the subject 1 is desired to be displayed as a three-dimensional image so that he or she can feel as if the image were coming up close. For example, data of the region of the subject 1 is stored in the memory as binary two-dimensional data in the same size as the image data with the specified subject region being expressed as 1 and the background being expressed as 0, for example.

In the next step S44, a parallax map is generated from the region of the subject 1 specified in the step S43. The parallax map shows an amount of deviation between two views of the subject having corresponding pixels on a two-dimensional plane in the image data obtained by viewing the subject from two different viewpoints. The binary data of the region of the subject 1 is subjected to filtering by a two-dimensional average filter in a predetermined size to generate two-dimensional real number array data, and this array data is used as the parallax map.

In the next step S45, the image data with the parallax map prepared in the step S44 being superposed on the image data is displayed. The data of the parallax map is multiplied by pixel values of R(Red)G(Green)B(Blue) components of the image data, and the resulting product values are displayed as the image data representing the parallax map. The user checks a three-dimensional image to be produced with reference to the parallax map displayed on the display section 5. If the user determines that there is necessity of correcting the parallax map, he or she operates the instruction selecting section 3 to give an instruction for acquiring a region of the subject 1 again, and the process returns to the step S43. On the other hand, if the user determines that there is no necessity of correcting the parallax map since it is a desired one, he or she operates the instruction selecting section 3 to give an instruction for performing the next processing, and the process then proceeds to the step S46.

In the step S46, the processing in the step S47 is repeated for the respective blocks of the three-dimensional image that is to be generated and outputted, and the image data of the respective blocks are sequentially outputted to the printing means 6.

A detailed description will now be given of the step S47.

First, in the step S47-1, to generate three-dimensional striped images of lines corresponding to the respective blocks of the three-dimensional image, processing in a step S47-2 is repeated for all pixels of the three-dimensional image to be generated.

The details of the processing in the step S47-2 will now be described. In the following description, the pixel position of the three-dimensional striped image to be generated is expressed as (ms, ns).

First, in a step S47-21, a viewpoint position to which the determined pixel to be subjected to processing belongs is found according to the horizontal position of the pixel (horizontal pixel position) and the number of viewpoints. Specifically, a three-dimensional striped image is synthesized from a multiple viewpoint image sequence such that pixels of the same coordinates in respective images of the multiple viewpoint image sequence are arranged as adjacent pixels in accordance with the arrangement of the viewpoints of the images. Assuming that the value of any pixel at the jth viewpoint is expressed as $P_{jmn}$ (where m and n are indexes of a pixel array in the horizontal and vertical directions, respectively, of a single viewpoint image constituting the multiple viewpoint images 71, 72, and 73), image data at the jth viewpoint is expressed as the following two-dimensional array of pixels:

$P_{j00}P_{j10}P_{j20}P_{j30} \ldots P_{j01}P_{j11}P_{j21}P_{j31} \ldots$
$P_{j02}P_{j12}P_{j22}P_{j32} \ldots$ The synthesis of the three-dimensional image 74 is carried out by decomposing the images at respective viewpoints into striped images in the vertical direction every line, and synthesizing an image from the decomposed images corresponding to the number of the viewpoints in order reverse to the arrangement order of the viewpoint positions. Accordingly, the synthesized three-dimensional image 74 is a striped image having a pixel array expressed as follows:

$P_{N00} \ldots P_{200}P_{100}P_{N10} \ldots P_{210}P_{110}P_{N20} \ldots$
$P_{220}P_{120} \ldots P_{N01} \ldots P_{201}P_{101}P_{N11} \ldots$
$P_{211}P_{111}P_{N21} \ldots P_{221}P_{121} \ldots P_{N02} \ldots$
$P_{202}P_{102}P_{N12} \ldots P_{212}P_{112}P_{N22} \ldots P_{222}P_{122}$ where N is the number of viewpoints, and the image at the first viewpoint becomes a left end image and the image at the Nth viewpoint becomes a right end image.

An index j representing the position of a viewpoint at a horizontal pixel position ms of the striped image is calculated according to the following equation (1):

$$j = N - \text{ms} \% N \qquad (1)$$

where % indicates a modulo operator.

In the next step S47-22, the pixel position in the single viewpoint image 71, 72 or 73 is found based on the number of viewpoints. The pixel position in the single viewpoint image 71, 72 or 73 corresponding to the pixel position (ms, ns) in the striped image is expressed as (ms/N, ns/N).

In the step S47-23, a parallax deviation at the pixel position (ms, ns) is calculated according to the pixel position of the single viewpoint image 71, 72 or 73 and the parallax map, based on the viewpoint position obtained in the step S47-21.

In calculating the parallax deviation, the viewpoint positions of the single viewpoint images 71, 72 and 73 constituting the multiple viewpoint image sequence are determined such that a predetermined parallax is obtained. If the parallax is too small, a degraded stereoscopic appearance would be obtained when observing a stereoscopic image. Conversely, if the parallax is too large, a stereoscopic image with reduced sharpness would be observed due to cross talk between adjacent images.

The viewpoint positions are determined such that the viewpoints are arranged at regular intervals for the reasons as follows. By arranging the viewpoint positions at regular intervals in the image sequence, a stable stereoscopic image can be observed. Further, the ratio between rise and fall of the perspective subject is adjusted to a predetermined value.

Where the parallax found from the parallax map is represented by d, a range of generated parallaxes is expressed as (j×r) using the viewpoint index acquired in the step S47-21, and the adjustment in the perspective parallax is sh, the parallax deviation $\Delta 0$ is calculated according to the following equation (5):

$$\Delta = (j \times r) \times (d - sh) \qquad (5)$$

where r indicates a predetermined value representing the parallax range.

It should be noted that if a parallax at a location in the parallax map, which corresponds to the pixel position in the single viewpoint image 71,72 or 73, is directly used as the parallax deviation based on the viewpoint position, image deviation occurs in an image region where the parallax is greatly changed.

The parallax map prepared in the step S44 represents the distribution of parallaxes corresponding to the respective pixels of the input image, and the single viewpoint image 71, 72 or 73 is considered to be one of images modified from the input image using the parallax map. It is therefore necessary to correct the pixel position in the single viewpoint image 71, 72 or 73 by the parallax deviation in order to obtain a parallax deviation corresponding to the pixel position in the single viewpoint image 71, 72 or 73 from the parallax map.

Therefore, according to the present embodiment, in the step S47-23, a parallax deviation at a pixel position after modification of the input image by the parallax deviation is estimated by interpolation using a first parallax deviation calculated according to the above equation (3) based on a parallax from the parallax map corresponding to the pixel position in the single viewpoint image 71, 72 or 73 and the viewpoint index, and a second parallax deviation calculated according to the above equation (3) based on a parallax from the parallax map corresponding to a pixel position obtained by correcting the pixel position in the single viewpoint image 71, 72 or 73 by the first parallax deviation.

It should be noted that in the present invention there is no particular limitation on the method of estimating the parallax deviation at the pixel position of the single viewpoint image modified by the parallax deviation.

In the next step S47-24, a pixel position in the input image is found according to the pixel position in the single viewpoint image 71, 72 or 73 obtained in the step S47-22 and the parallax deviation obtained in the step S47-23.

In the next step S47-25, a pixel value corresponding to the pixel position in the input image is acquired from the input image, and is written into the pixel at the position (ms, ns) in the three-dimensional striped image. Incidentally, to find the pixel value corresponding to the pixel position in the real number coordinates of the input image, the pixel value is calculated by bilinear interpolation, for example.

By repeating the above processing from the step S47-21 to S47-25 for the pixels within the required image regions of the three-dimensional image, partial images of the three-dimensional striped image can be directly synthesized from the input image using the parallax map in the step S47-1.

In the next step S47-3, the stereoscopic strip image synthesized in the step S47-1 is enlarged or reduced so as to make the pitch thereof coincide with the pitch of the lenticular sheet, and is outputted as a three-dimensional image. The three-dimensional strip image is enlarged or reduced by bilinear interpolation, for example.

In the next step S47-4, the image data for one block generated in the step S47-3 is outputted to the printer 6.

By repeating the processing from the step S47-1 to the step S47-4 for all blocks of the three-dimensional image, data for all the images of the three-dimensional image are sequentially outputted to the printer 6 to be printed thereby.

The process is terminated after the processing from the step S47-1 to S47-4 has been repeated for all blocks of the three-dimensional image.

The above-described process enables the three-dimensional image to be observed through the lenticular sheet superposed thereon, and greatly reduces the image memory capacity required for synthesizing and printing the three-dimensional image, as is the case with the above described third and fourth embodiments.

Sixth Embodiment

A description will now be given of a sixth embodiment of the present invention with reference to FIGS. 10A and 10B.

The basic construction of a three-dimensional image forming system according to the present embodiment is identical with the one in FIG. 1 showing the third embodiment, and thus, FIG. 1 will be referred to as the need arises in the following description.

In the above described fifth embodiment, the present invention is applied to the method in which the three-dimensional image is printed based on one image in accordance with the algorithm of synthesizing the three-dimensional image from the input images by means of the parallax map and decomposing and printing it, but in the present embodiment, the present invention is applied to another system that synthesizes a three-dimensional striped image from input images.

The present embodiment is applied to Japanese Laid-Open Patent Publication (Kokai) No. 2001-346226, for example.

Figure 10A:
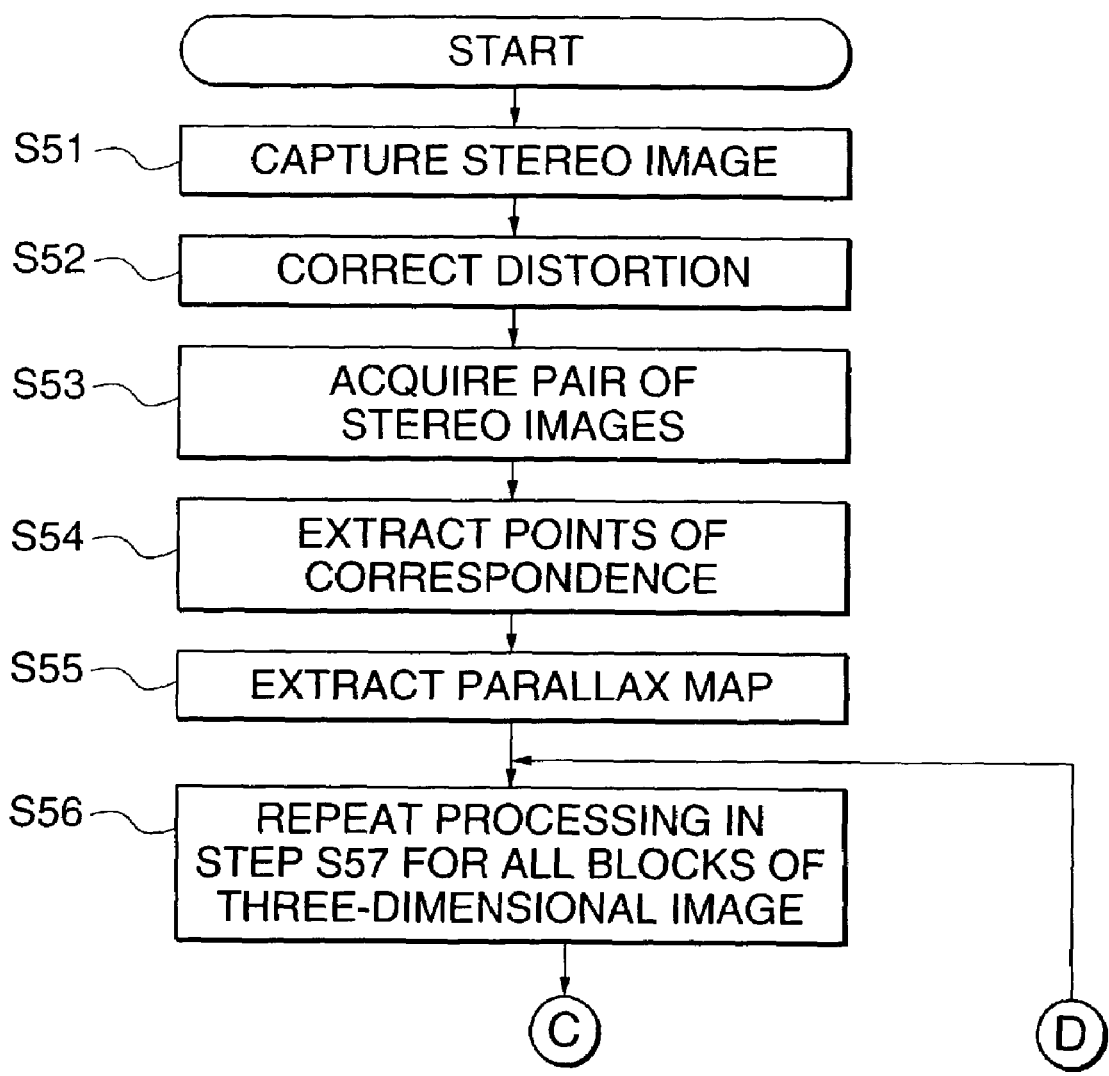
FIGS. 10A and 10B is a diagram showing an algorithm of a processing program executed by an image processing means of the stereoscopic image forming system according to a sixth embodiment of the present invention.
Figure 10B:
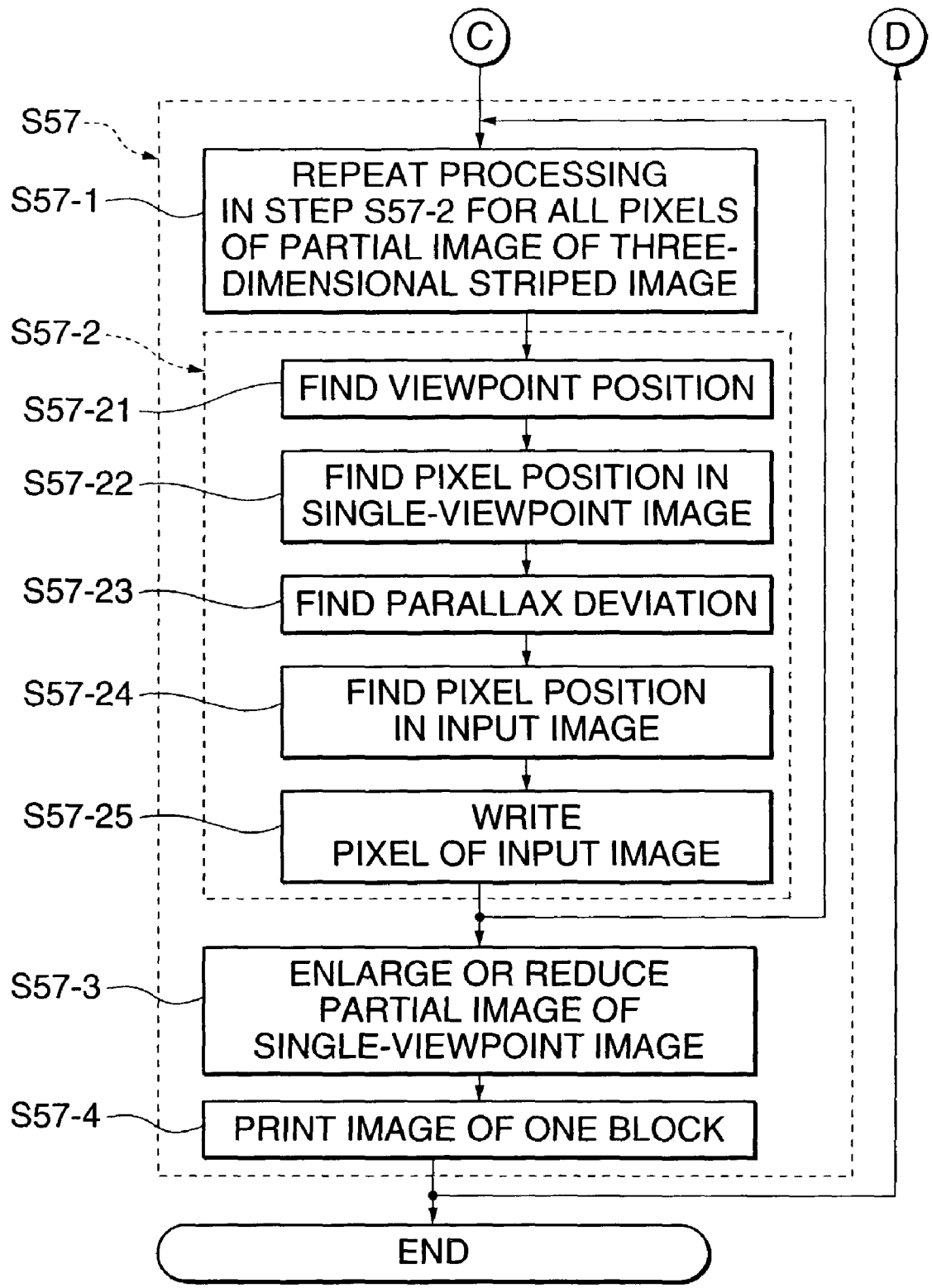

FIGS. 10A and 10B shows an algorithm of a processing program executed by a three-dimensional image forming system according to the present embodiment.

It should be noted that steps S56, S57-1, S57-2, S57-3, S57-4, S57-21, S57-22, S57-23, S57-24, and S57-25 in FIGS. 10A and 10B are identical with the steps S46, S47, S47-2, S43, S47-4, S47-21, S47-21, S47-2, S47-23, S47-24, S47-25, respectively, in FIGS. 9A and 9B showing the third embodiment. Therefore, a detailed description thereof is omitted herein, and only process steps specific to the present embodiment will be described below.

In the present embodiment, processing from the step S51 to S55 in FIGS. 10A and 10B is performed in place of the processing from the step S41 to S45 in FIGS. 9A and 9B.

Specifically, from the step S51 to S55 in FIGS. 10A and 10B, a parallax map is extracted from stereo images in a method disclosed in Japanese Laid-Open Patent Publication (Kokai) No. 2001-346226.

In further detail, first, stereo images are acquired in the step S51, and distortion correction is carried out on the acquired stereo images in the step S52. A pair of stereo images is then acquired in the next step S53, and points of correspondence are extracted in the step S54. The parallax map is then extracted in the step S55.

In the step S55 and subsequent steps, the three-dimensional image 74 is generated according to the parallax map extracted in the step S55 from any one of the stereo images acquired in the step S54 as the input image, and is printed by the printer 6.

The above process enables the three-dimensional image to be observed through the lenticular sheet superposed thereon, and greatly reduces the image memory capacity required for synthesizing and printing the three-dimensional image, as is the case with the above described first to third embodiments.

Although in the above described embodiments, the three-dimensional image forming system is based on the three-dimensional image method using the lenticular sheet, the present invention may be applied to a three-dimensional image forming system based on the integral photography and the barrier method.

It should be noted that the present invention may either be applied to a system comprised of a plurality of apparatuses (e.g., a host computer, interface equipment, a reader, and a printer) or to a single apparatus (e.g., a copying machine, a facsimile machine, and the like).

Moreover, it is to be understood that the object of the present invention may also be accomplished by supplying a system or an apparatus with a storage medium in which a program code of software which realizes the functions of the above described embodiments is stored, and causing a computer (or CPU or MPU) of the system or apparatus to read out and execute the program code stored in the storage medium.

In this case, the program code itself read from the storage medium realizes the functions of the embodiment described above, and hence the storage medium on which the program code is stored constitutes the present invention. Examples of the storage medium for supplying the program code include a floppy (registered trademark) disk, a hard disk, an optical disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM.

Further, it is to be understood that the functions of the above described embodiment may be accomplished not only by executing a program code read out by a computer, but also by causing an OS (Operating System) or the like which operates on the computer to perform a part or all of the actual operations based on instructions of the program code.

Further, it is to be understood that the functions of the above described embodiment may be accomplished by writing a program code read out from the storage medium into an expansion board inserted into a computer or a memory provided in an expansion unit connected to the computer and then causing a CPU or the like provided in the expansion board or the expansion unit to perform a part or all of the actual operations based on instructions of the program code.

As described above, the three-dimensional image is divided and synthesized and sequentially outputted to the printer, and this greatly reduces the image memory capacity required for printing the three-dimensional image.

Seventh Embodiment

A description will now be given of a seventh embodiment of the present invention. According to the prior art disclosed in Japanese Laid-Open Patent Publication (Kokai) No. 5-210181, images viewed from more viewpoints are generated from images of a subject viewed from a plurality of viewpoints by interpolation, and a three-dimensional image is synthesized from the images by electronic processing. That is, the electronic interpolation of the images reduces the number of viewpoints of images required to be photographed. Moreover, the prior art disclosed in the same publication utilizes the recent digital photography to simplify the conventional three-dimensional image forming method.

However, the prior art has the disadvantage that it is difficult to shoot a moving subject due to the requirement for a plurality of images.

To overcome the above disadvantage, a method has been proposed which comprises shooting a subject from two viewpoints at the right and left to acquire a pair of stereo images by a camera to which is mounted a photographing adapter, and acquiring multiple viewpoint images from the stereo images by electronic interpolation to form a stereoscopic image. This method, however, has a problem of requiring the stereophotographing adapter not required by normal photographing. It is therefore preferred that multiple viewpoint images are acquired from one image to synthesize a stereoscopic image.

On the other hand, Japanese Laid-Open Patent Publication (Kokai) No. 8-140116 has disclosed a method which comprises carrying out photometry for a plurality of blocks of an image during photographing, recording the resulting distance values as well as the image, and acquiring multiple viewpoint images based on the distance values to acquire a stereoscopic image.

As a method of acquiring multiple viewpoint images from one image, a method is known which comprises cutting out a subject region from the background in an image, and synthesizing the background image and the subject image which are displaced from each other by a predetermined parallax in generating multiple viewpoint images so that the user can feel as if the subject image were coming up close when a lenticular sheet is superposed on the subject region.

The prior art disclosed in Japanese Laid-Open Patent Publication (Kokai) No. 8-140116, however, requires a special apparatus for acquiring the distance values concerned with the plurality of blocks during photographing, and requires recording of the distance values as well as the image. It is therefore impossible to form a three-dimensional image from the normally photographed images.

Further, according to the method in which the multiple viewpoint images are acquired from one image, the subject cut out from the background looks like a partition in the background and is not seen with a natural three-dimensional appearance when the three-dimensional image synthesized from the acquired multiple viewpoint images is observed through the lenticular sheet. Moreover, since the subject region must be cut out manually, there has been a desire to specify the subject region more easily.

Therefore, the present embodiment aims to provide a three-dimensional image forming system, three-dimensional image forming method, program for implementing the method, and storage medium storing the program, which make it possible to acquire multiple viewpoint images from one image without special photographing, print a three-dimensional image synthesized from the multiple viewpoint images, and observe the three-dimensional image of a subject as a natural three-dimensional image through an optical member such as a lenticular sheet superposed on the image.

To this end, a three-dimensional image forming system according to the present embodiment is comprised of: image acquiring means for acquiring an image of a subject (subject image); region acquiring means for acquiring a subject region from the subject image; parallax map extracting means for extracting a parallax map representing a depth distribution of the subject from the subject region; multiple viewpoint image generating means for generating multiple viewpoint images of the subject viewed from a plurality of viewpoints based on the subject image and the parallax map; image synthesizing means for synthesizing a three-dimensional image such that pixels of the same coordinates in respective ones of the multiple viewpoint images of the subject are arranged as adjacent pixels in accordance with the arrangement of the viewpoints; and output means for superposing an optical member having a cyclic structure on the three-dimensional image, wherein a three-dimensional image can be observed through the optical member.

The construction of the three-dimensional image forming system according to the present embodiment is identical with the one in FIG. 1 showing the first embodiment, and illustration thereof is omitted. The instruction selecting section 3, image processor 4, and display section 5 are implemented by a general-purpose PC (personal computer), for example. The general-purpose PC has a known CPU, ROM, RAM, etc., and a hard disk as a recording medium incorporated therein.

An image of a subject shot by the camera 2 is captured into the image processor 4. Specifically, the image processor 4 boots up driver software of the camera 2 in the PC as the image processor 4 and performs predetermined processing to temporarily record image data of the subject shot by the camera 2 in the hard disk of the PC via the USB interface. The image data acquired by the camera 2 is recorded in a CF (Compact Flash, registered trademark), for example. Therefore, in the case where the image processor 4 has a PC card slot, image data recorded in a CF card can be handled as the same as image data recorded in the hard disk of the PC by disconnecting the CF card from the camera 2, mounting the CF card into a CF card adapter which can be inserted into the PC card slot, and inserting the CF card adapter into the PC card slot without the necessity of connecting the camera 2 and the image processor 4 to each other.

The image processor 4 then processes the images thus captured into the image processor 4 to generate multiple viewpoint images of a subject, synthesizes a three-dimensional image from the multiple viewpoint images, and outputs it to the printer 6. This sequence of processing is executed by application software installed in the PC, for example.

Figure 11:
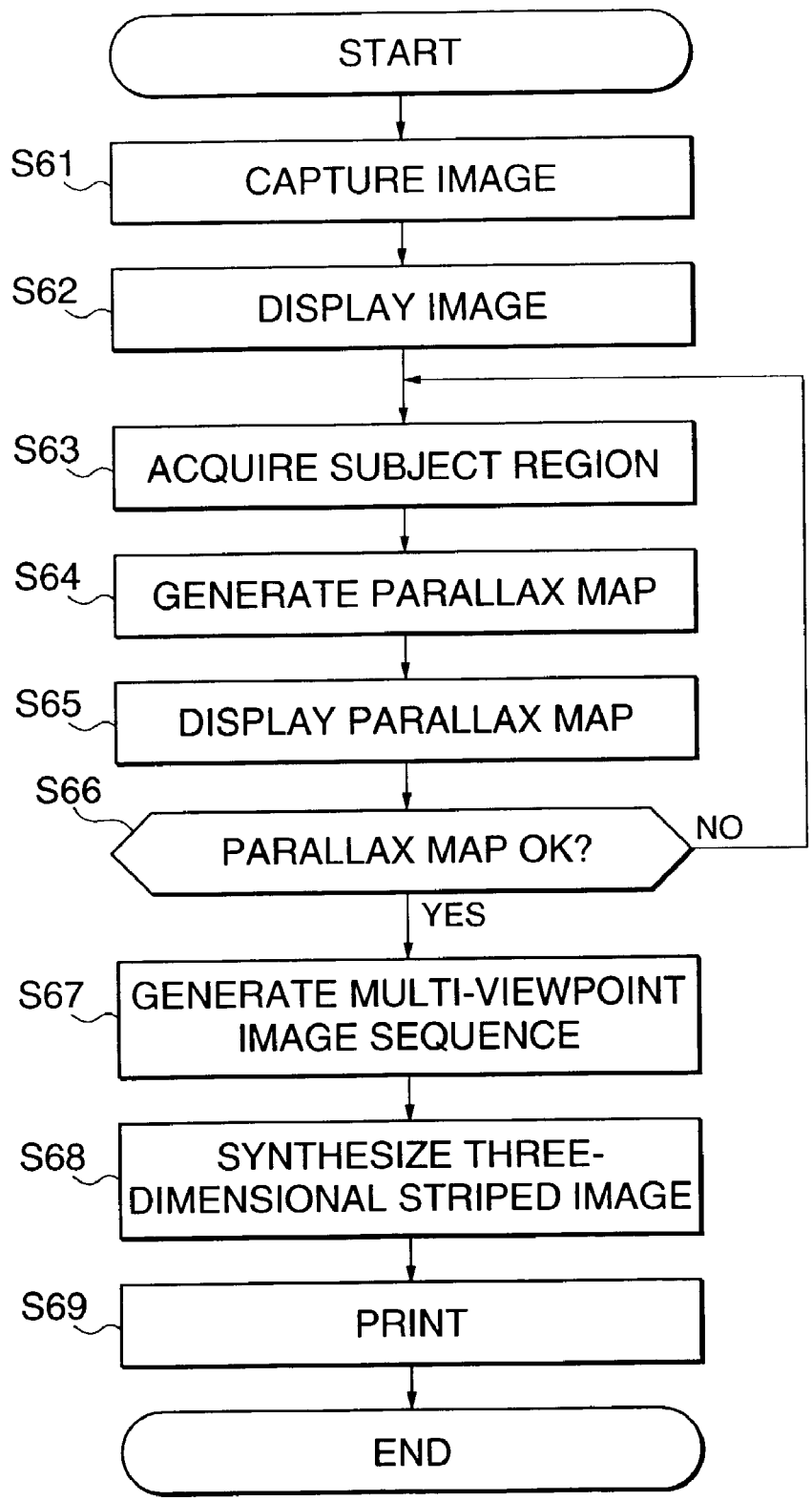
FIG. 11 is a flow chart showing a stereoscopic image forming process carried out by an image processor 4 of a stereoscopic image forming system according to a seventh embodiment of the present invention.

FIG. 11 is a flow chart showing a three-dimensional image forming process carried out by the image processor 4 of the three-dimensional image forming system. A processing program for executing the method is stored in the ROM, not shown, in the image processor 4 equivalent to the PC body, and is executed by the CPU, not shown, of the image processor 4.

First, the image of the subject shot by the camera 2 is captured into the memory of the PC as the image processor 4 so that it can be converted into data capable of being handled by the processing program (step S61). At this time, a file name of image data or the like is designated through the instruction selecting section 3, and the designated file name is read into the program. On this occasion, the image data is converted into two-dimensional array data or a bit map of RGB channels. Particularly, if the input image data is compressed data such as data in the JPEG image format or the like, conversion of the image data, such as decompression of the JPEG image, is required because such compressed data can be directly processed with difficulty.

The image data captured in the step S61 is displayed on the display section 5 (step S62). On this occasion, an image is displayed inside a plain rectangular region representing the sheet size. This enables the user to confirm the size and position of the image data that is to be printed on a sheet.

Figure 12:
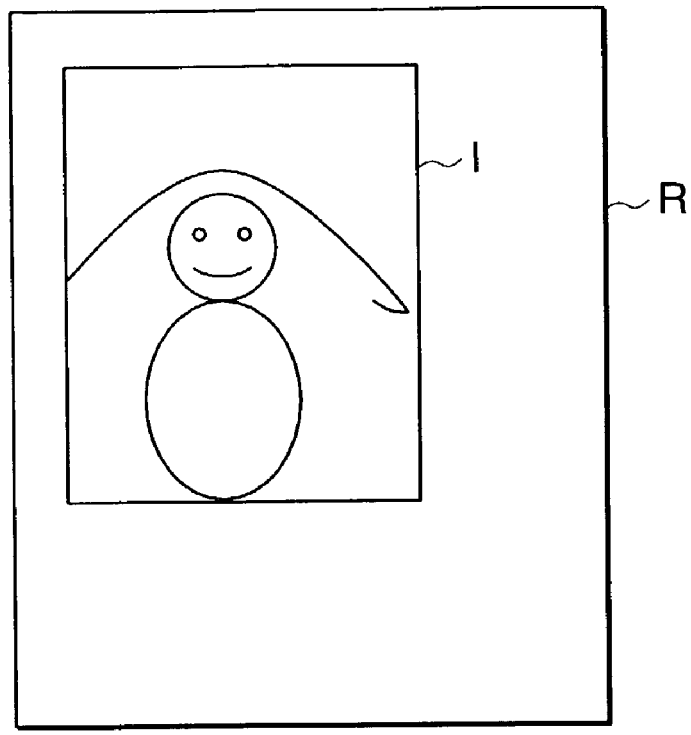
FIG. 12 is a view showing an example of displayed image data.

FIG. 12 shows an example of the image data displayed on the display section 5. In FIG. 12, R denotes the plain rectangular region representing the sheet size, and I denotes the captured image. The size and position of the image on the sheet are calculated in advance according to parameters such as the sheet size and the print size (resolution) per pixel of the image data. The user specifies the size, position, and orientation (rotating direction on the sheet) of the image by operating the instruction selecting section 3 to change the parameters, and accordingly, the image displayed on the display section 5 is updated.

Figure 13:
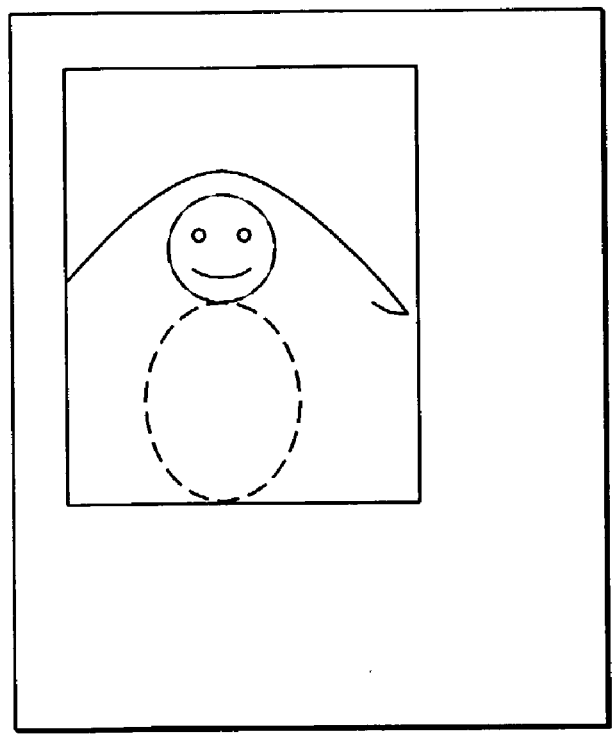
FIG. 13 is a view showing an example in which a subject region is specified in an image shown in FIG. 12.

A subject region is then acquired (step S63). First, the user specifies the subject region where the subject is desired to be displayed as a three-dimensional image on the display section 5 so that he or she can feel as if the image were coming up close. For example, in the case of the scene in which a person is standing in front of the background as shown in FIG. 12, the user specifies the subject region along the outline of the person. FIG. 13 shows an example in which the subject region is specified with respect to the image in FIG. 12. In FIG. 13, broken lines indicate the outline of the subject region specified by the user. Subject region data is stored in a memory as binary two-dimensional data in the same size as the image data with the specified subject region being expressed as 1 and the background being expressed as 0, for example.

A parallax map is generated from the subject region specified in the step S63 (step S64). The parallax map shows an amount of deviation between two views of the subject having corresponding pixels on a two-dimensional plane in the image data obtained by viewing the subject from two different viewpoints. The binary data of the region of the subject 1 is subjected to filtering by a two-dimensional average filter in a predetermined size to generate two-dimensional real number array data, and this array data is used as the parallax map. The average filtering blurs the outline of the specified subject so that the user can feel as if the subject were gradually coming up close from the background without looking like a partition in the background.

If the size of the two-dimensional average filter is too large, a smoother three-dimensional image can be observed, but the outline of the subject region specified by the user is blurred and the formed three-dimensional image cannot faithfully reflect the user's intention. If the size of the two-dimensional average filter is too small, the subject looks more like a partition although the formed image faithfully respects the user's intention. The size of the two-dimensional average filter is preferably between 5% and 10% of the image size.

If the size of the image data captured in the step S1 is too large, a great deal of calculations is required for filtering. To address this problem, the data of the subject region may be subjected to filtering after being reduced by a predetermined ratio, and then the parallax map may be enlarged to the original size.

As a method of acquiring an empirically preferred three-dimensional form from the outline of the specified subject region, a method is known which comprises replacing the outline form by a polygon, estimating the skeleton of the polygon, determining the heights of apexes constituting the skeleton according to the distance from the boundary of the polygon to thus acquire a pseudo three-dimensional form (refer to "Teddy: A sketching Interface for 3D Freeform Design", T. Igarashi, S. Matsuoka, H. Tanaka, SIG-GRAPH99 Conference Proceedings).

According to this method, a three-dimensional form is acquired which assumes a thick section for a wide part of a subject region and a thin section for a narrow part of the subject region. This method may be applied to the method of acquiring the parallax map from the subject region. Specifically, the subject region acquired in the step S63 is stored as line graphic data such as a chain code representing the outline form. First, the outline form is approximated to a polygon. Then, a three-dimensional form is acquired from the approximate polygon data using the above method, and perspective projection of the three-dimensional form from predetermined two viewpoints is carried out to acquire a parallax map representing the amount of deviation between pixel positions corresponding to respective pixels of two views obtained by viewing the subject from the two viewpoints. In an easier way, the parallax may be determined such that it is proportional to the height data of the acquired three-dimensional form.

The parallax map is then displayed in a manner being superposed on the image data (step S65). Specifically, the data of the parallax map is multiplied by pixel values of RGB components of the image data, and the resulting product values are displayed as the image data representing the parallax map.

Figure 14:
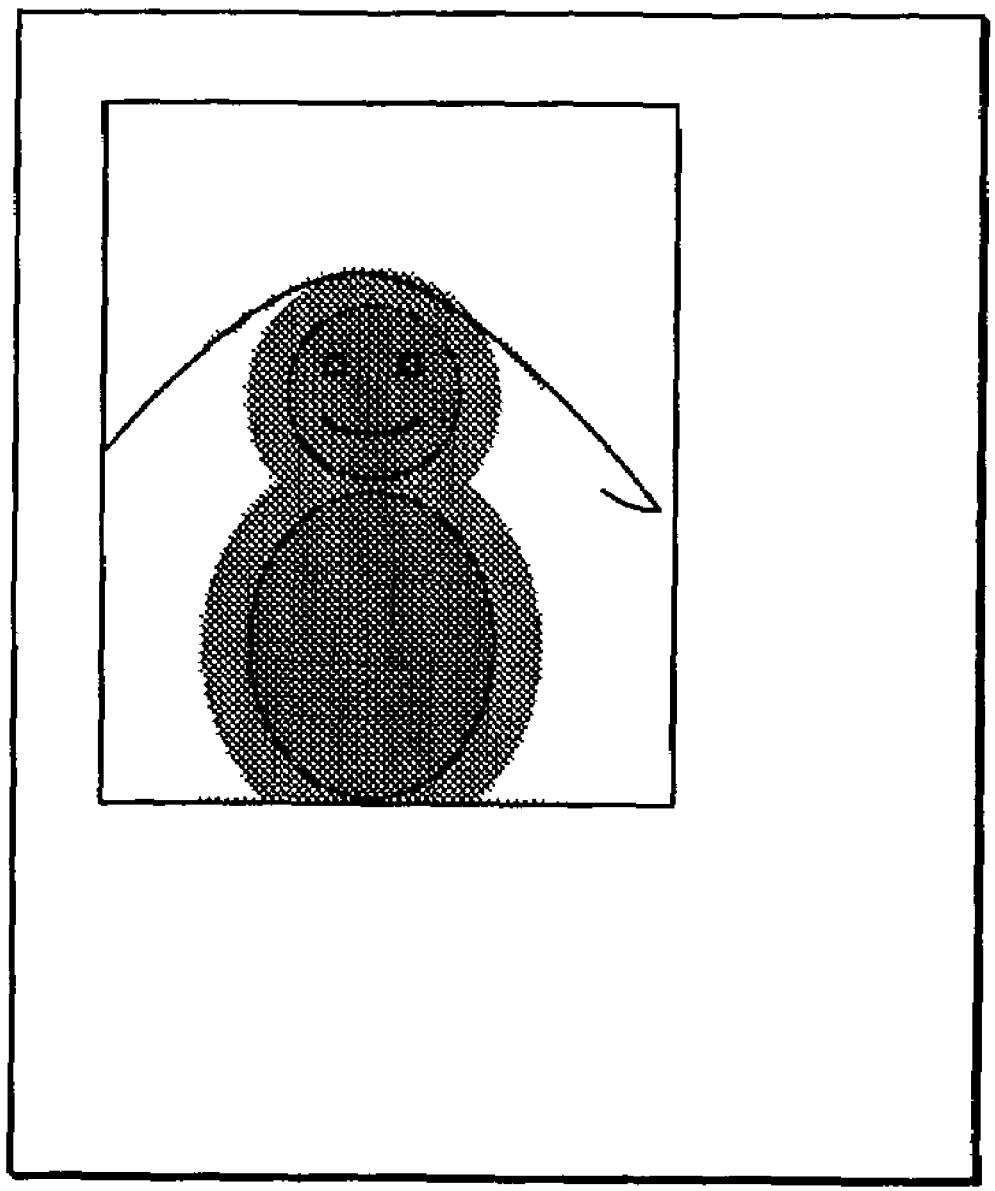
FIG. 14 is a view showing an example of a displayed parallax map generated from data in FIGS. 13 and 14.

In the present embodiment, the parallax on the front side is 0 and the parallax on the rear side is 1, and thus, a darker image is displayed as the distance from the camera 2 is decreased. FIG. 14 shows an example of the displayed parallax map generated from the data shown in FIGS. 12 and 13.

The user checks a three-dimensional image to be produced with reference to the displayed parallax map. That is, the user determines whether the parallax map displayed in the step S65 is a desired one or not (step S66). If the user determines that there is no necessity of correcting the parallax map since it is a desired one, he or she operates the instruction selecting section 3 to give an instruction for performing the next processing, and the process proceeds to a step S67.

On the other hand, if the user determines in the step S66 that there is the necessity of correcting the parallax map, he or she operates the instruction selecting section 3 to give an instruction for acquiring a subject region again, and the process returns to the step S63.

Multiple viewpoint images are then generated using the desired parallax map (step S67). The multiple viewpoint images generated in this step constitute a three-dimensional striped image, and the size of each image depends on the number of images, the print resolution, and the print size. Assuming that the resolution of the printer 6 is RP dpi (dot per inch) and the print size is XP×YP inch, the size of an image to be printed will be X(=RP×XP)×Y(=RP×YP) pixels. The number of images N is determined so that N can be equal to RP×RL in conformity with the RL inch-pitch of the lenticular sheet. Since N is an integer, the number of images is set to an integer closest to RP×RL.

For example, assuming that the print resolution is 600 dpi and the pitch of the lenticular sheet is 1/50.8 inches, N is preferably 12. In this case, the size of the image corresponding to each viewpoint is H(=X/N)×V(=Y). Practically, the print size is determined so that H and V are each an integer. For example, if H=200 pixels and V=1800 pixels, the print size is 4×3 inches because X is 2400 pixels and Y is 1800 pixels.

Actually, the print size varies to some degree due to the necessity of coinciding the pitch of the lenticular sheet and the pitch of the image cycle with each other, and this processing is executed in a step S8 described later. The images are generated by modifying the image captured in the step S1 using the parallax map.

Assuming that the size of the image is h (=800)×v (=600) pixels, an image of 200×600 pixels is generated in conformity with the number of pixels H in the horizontal direction and the number of pixels v in the vertical direction. The reason why the number of pixels in the vertical direction is smaller is that the number of pixels in the vertical direction of each image required for printing is much greater than the number of pixels in the horizontal direction and a long processing time is required for generating a large-size image using the parallax at a time.

The viewpoint position of each generated image is determined so as to provide a predetermined parallax. If the parallax is too small, a degraded stereoscopic appearance would be obtained when observing a three-dimensional image. Conversely, if the parallax is too large, a stereoscopic image with reduced sharpness would be observed due to cross talk between adjacent images. Also, the viewpoint positions are determined such that the viewpoints are arranged at equal intervals and in symmetrical about the viewpoint position of the left image. The reasons for this are as follows. By arranging the viewpoint positions of the image sequence at equal intervals, a stable three-dimensional image can be observed. Further, by arranging the viewpoint positions in symmetrical about the viewpoint position of the left image, deformation of the image can be minimized and a high-quality three-dimensional image can be stably obtained even if an error occurs in the parallax map dependently on the subject and shooting conditions.

The parallax corresponding to the subject position closest to the camera 2 and the parallax corresponding to the farthest subject position are determined based on the parallax map prepared in the step S64. Since the parallax map is comprised of real values from "0" to "1", the parallax corresponding to the closest subject position is "0" and the parallax corresponding to the farthest subject position is "1". The viewpoint position is determined so that, when observing the image from a predetermined position, the nearest subject appears to be positioned at a location closer to the user from the print surface by a predetermined distance and the farthest subject appears to be positioned at a location farther away from the user from the print surface by a predetermined distance.

On this occasion, parameters actually used for generating the image are a ratio r relative to the parallax between the pair of right and left stereo images and adjustment in the perspective parallax sh. For example, a ratio r=0 represents the left image itself, and a ratio r=1 represents the image at the viewpoint position of the right image. It should be noted that if the parallax map contains an error, there may also be an error in the parallax of the nearest object and the farthest object, and therefore, the parameters for use in generating the image may be determined based on a statistical distribution over the entire parallax map by a method not affected by an error.

The method of generating each viewpoint image will now be described. First, a new viewpoint image is generated by forward mapping using the pixels of the left image. More specifically, a position $(X_N, Y_N)$ in the new viewpoint image used for mapping the pixels of the left image is determined according to the following expression (6) based on the parallax d at the pixel position (x, y) in the left image, the ratio r representing the viewpoint position, the size of the left image, and the size of the new viewpoint image:

$$X_N = H/h \times (x + (d - sh)), Y_N = y \quad (6)$$

The pixel at the pixel position (x, y) in the left image is copied to the position (Xn, Yn) in the new viewpoint image. This processing is repeated for all pixels of the left image. Subsequently, a filling process is carried out on those of the pixels of the new viewpoint image, which have not been assigned from the left image. This filling process is performed by searching for an effective pixel positioned at a predetermined distance from the target pixel, and assigning to the effective pixel a weighted average value using the distance to the effective pixel. If no effective pixel is found, the search is repeated over an enlarged search area. The new viewpoint image in which all the pixels are effective is generated by the above processing. A multiple viewpoint image sequence is obtained by repeating the above processing a number of times corresponding to the number of viewpoints.

A three-dimensional striped image is synthesized from the multiple-viewpoint sequence (step S68). On this occasion, the three-dimensional striped image is synthesized such that pixels of the same coordinates in respective images of the multiple viewpoint image sequence are arranged as adjacent pixels in accordance with the arrangement of the viewpoints of the images. Assuming that the value of any pixel at the jth viewpoint is $P_{jmn}$ (where m and n are indexes of a pixel array in the horizontal and vertical directions, respectively), the jth image data is represented as the following two-dimensional array of pixels:

$$P_{j00}P_{j10}P_{j20}P_{j30}\ldots P_{j01}P_{j11}P_{j21}P_{j31}\ldots$$
$$P_{j02}P_{j12}P_{j22}P_{j32}\ldots$$

The synthesis of the three-dimensional image is carried out by decomposing the images at respective viewpoints into striped images every line in the vertical direction, and synthesizing an image from the decomposed images corresponding to the number of the viewpoints in order reverse to the arrangement order of the viewpoint positions. Accordingly, the synthesized image is a striped image having a pixel array expressed as follows:

$$P_{N00}P_{200}P_{100}P_{N10}\ldots P_{210}P_{110}P_{N20}\ldots P_{220}P_{120}\ldots$$
$$P_{N01}\ldots P_{201}P_{101}P_{N11}\ldots P_{211}P_{111}P_{N21}\ldots$$
$$P_{221}P_{121}\ldots P_{N02}\ldots P_{202}P_{102}P_{N12}\ldots$$
$$P_{212}P_{112}P_{N22}\ldots P_{222}P_{122}$$

where N is the number of viewpoints, and the image at the first viewpoint becomes a left end image and the image at the Nth viewpoint becomes a right end image. The reason why the image is synthesized in order reverse to the arrangement order of the viewpoint positions is that, when the image is observed using a lenticular sheet, the image appears to be reversed in position in the left and right direction within one pitch of the lenticular sheet. When the original multiple viewpoint image sequence is comprised of images of N viewpoints, each having a size of H×v, the three-dimensional striped image has a size of X(=N×H)×v.

Then, the three-dimensional striped image is enlarged or reduced to make the pitch thereof coincide with the pitch of the lenticular sheet. In the image, one pitch is comprised of N pixels each having RP dpi and hence one pitch is N/RP inches. On the other hand, the pitch of the lenticular sheet is RL inches. Therefore, the image is enlarged (RL×RP×Y)/(N×v) times in the horizontal direction to make the pitch thereof coincide with the pitch of the lenticular sheet. Since the number of pixels in the vertical direction must be (RL×RP/N)×Y in this case, the image is also enlarged (RL×RP×Y)/(N×v) times in the vertical direction for scale matching. Thus, image data for printing is obtained by executing the above described scaling process on the three-dimensional strip image in the horizontal and vertical directions. The scaling process may be performed by bilinear interpolation, for example. The three-dimensional striped image thus synthesized may be stored in the hard disk of the PC. Finally, the image acquired in the step S68 is printed (step S69), followed by the process being terminated.

The processing from the step S61 to S69 enables a natural three-dimensional image reflecting the user's intention to be observed through the lenticular sheet superposed on the printed image. Thus, the present embodiment enables printing of a three-dimensional image synthesized from one image without the necessity of any complicated or special shooting operation.

Eighth Embodiment

Figure 15:
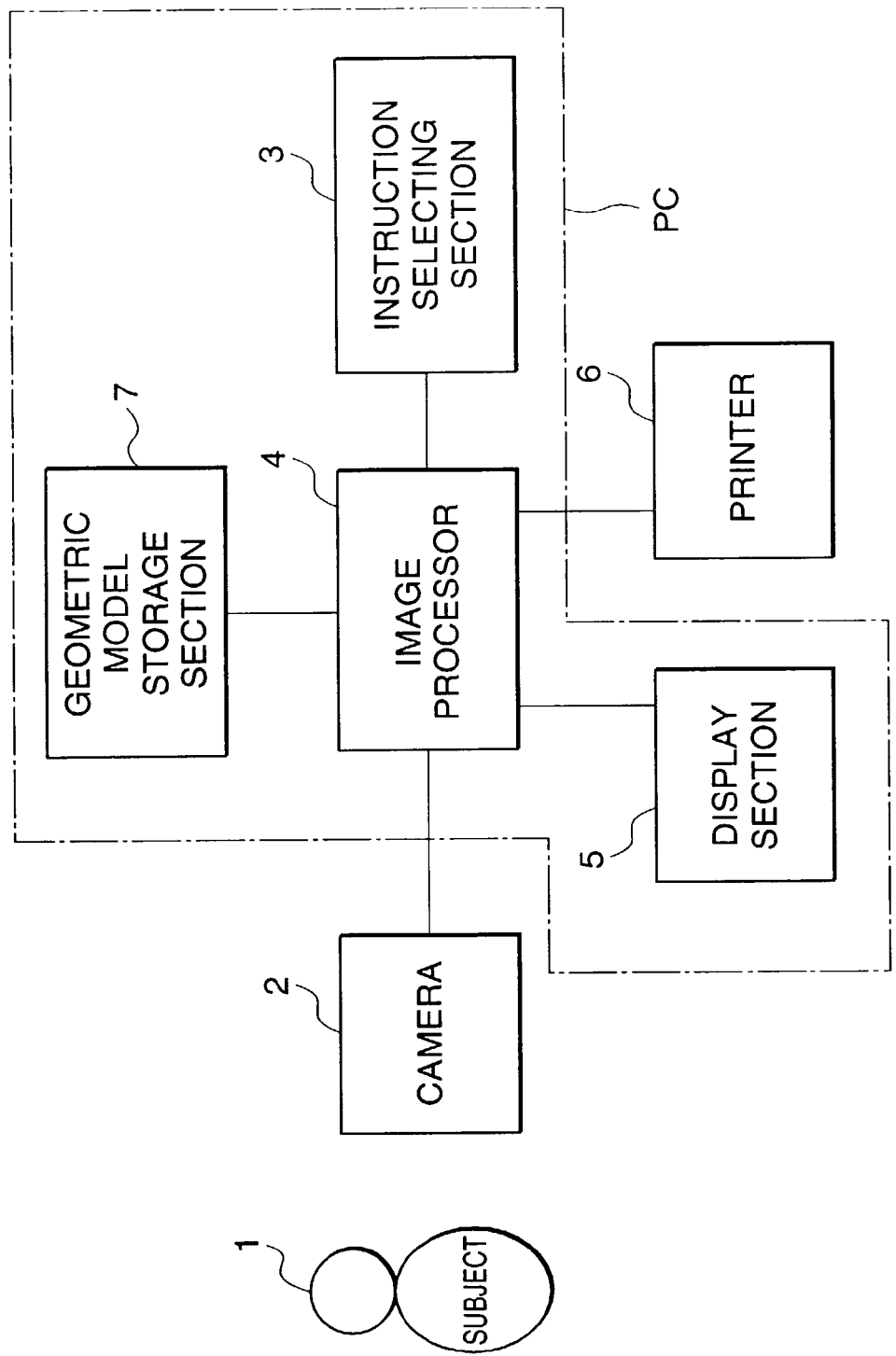
FIG. 15 is a block diagram showing the arrangement of a stereoscopic image forming system according to an eighth embodiment of the present invention.

FIG. 15 shows the construction of the three-dimensional image forming system according to an eighth embodiment of the present invention. Elements and parts in FIG. 15 corresponding to those of the seventh embodiment are denoted by the same reference numerals, and a description thereof is omitted herein. In FIG. 15, reference numeral 7 denotes a geometric model storage section that stores a plurality of standard three-dimensional forms as wire frame model data, surface model data, or the like.

Figure 16:
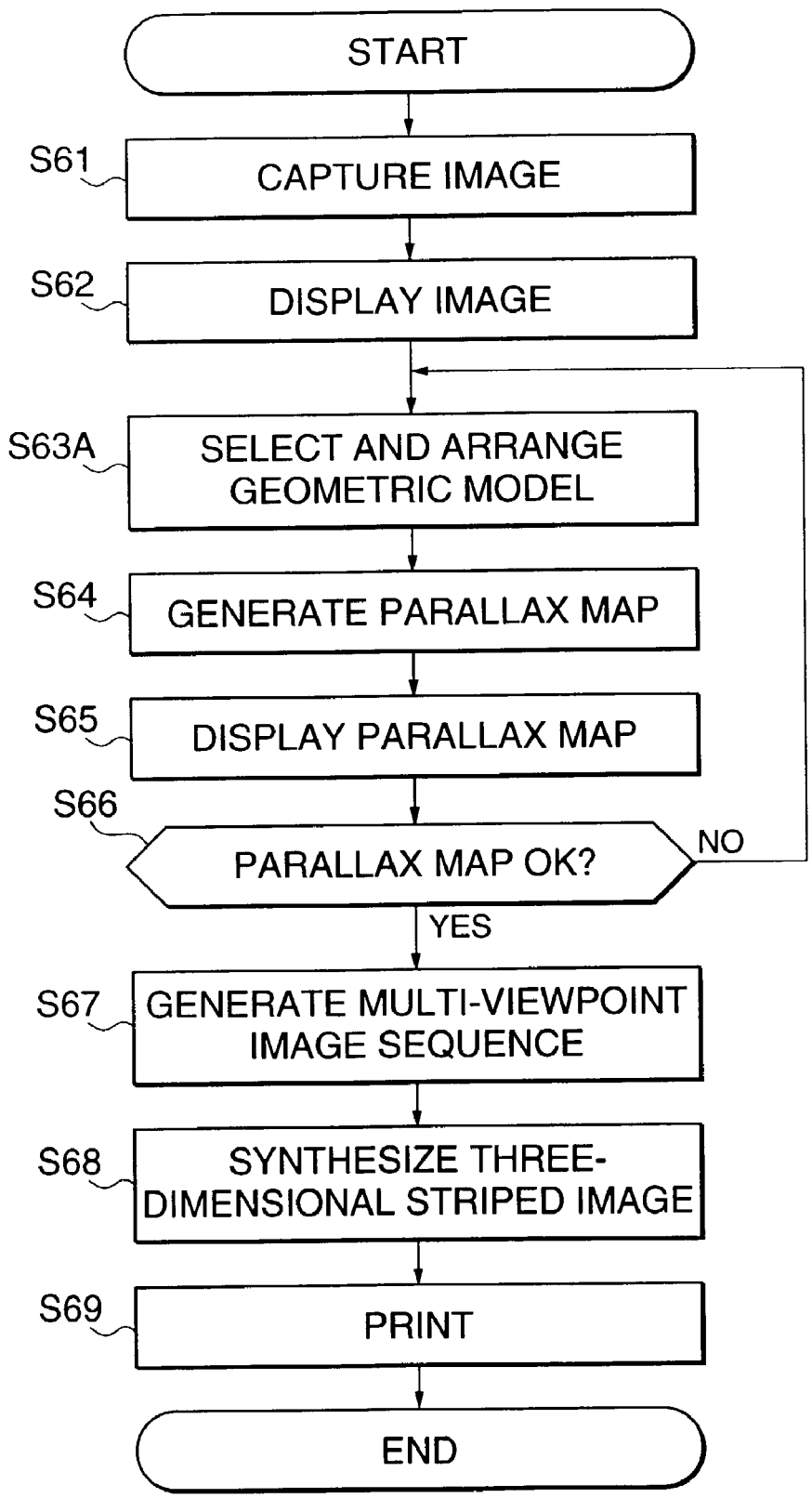
FIG. 16 is a flow chart showing the stereoscopic image forming process carried out by the image processor 4 of the stereoscopic image forming system according to the eighth embodiment.

FIG. 16 is a flow chart showing a three-dimensional image forming process executed by the three-dimensional image forming system according to the present embodiment. A processing program for implementing this process is stored in the ROM, not shown, of the image processor 4 equivalent to the PC body, for execution by the CPU, not shown, of the image processor 4. Steps in FIG. 16 corresponding to those in the seventh embodiment are denoted by identical reference numerals, description of which is omitted.

In the eighth embodiment, a process of selecting and laying out geometric models is carried out in place of the process of acquiring the subject region in the step S63 of the seventh embodiment.

First, as is the case with the seventh embodiment, the captured image is displayed on the display section 5 according to the user's instruction by performing the processing from the step S61 to S62.

A geometric model is then selected and laid out in accordance with the user's instruction (step S63A). In this step, the three-dimensional geometric model is drawn in a desired orientation and from a desired viewpoint and displayed in a manner being superposed on the image, and the three-dimensional geometric model is then deformed.

Figure 17:
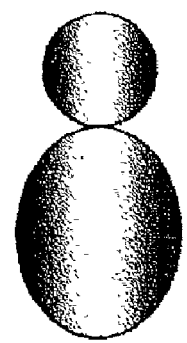
FIG. 17 is a view showing a geometric model of a subject.

Specifically, a list of forms stored in the geometric model storage section 7 is displayed on the display section 5. The user selects a geometric model that is most likely to match the form of the subject. For example, let it be assumed that the user selects a geometric model in FIG. 17 as the geometric model of the subject with respect to the image in FIG. 13, referred to before. FIG. 17 shows the geometric model of the subject.

Figure 18:
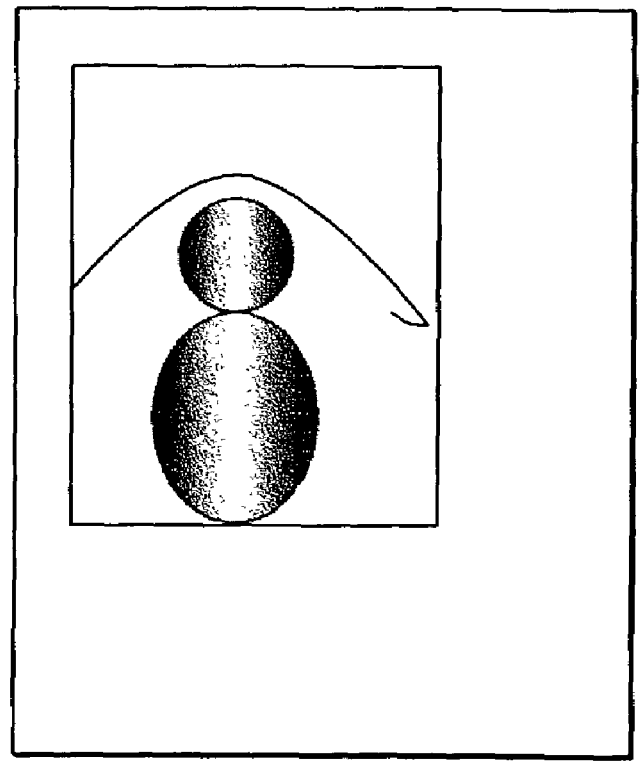
FIG. 18 is a view showing a state in which the selected geometric model is applied to an image.

The selected geometric model is drawn in a standard orientation and from a standard viewpoint and superposed on the image to be displayed on the display section 5. By operating the instruction selecting section 3, the user can freely move, rotate, and deform the geometric model displayed in the image, and superpose the geometric model on the subject region in the image and temporarily store the subject shape data. FIG. 18 shows the selected geometric model superposed on the image.

The parallax map is generated from the subject geometric data acquired in the step S63A (step S64). If the parallax map is generated from the three-dimensional form, the method in the step S64 of the seventh embodiment, for example is used. That is, the three-dimensional form is converted by perspective projection from two predetermined viewpoints to acquire the parallax map of the image. In an easier way, the parallax may be determined such that it is proportional to the height data of the resulting three-dimensional form.

The acquired parallax map is displayed on the display section 5 (step S65). The user determines whether the displayed parallax map is a desired one or not (step S66). If the user determines that there is the necessity of correcting the parallax map, the process returns to the step S63A to repeat the same processing. On this occasion, the geometric data superposed on the image is the geometric data that is temporarily stored in the step S63A.

On the other hand, if the user determines in the step S66 that the displayed parallax map is a desired one, the processing from the step S67 to S69 is performed to print a three-dimensional striped image as is the case with the seventh embodiment.

Thus, according to the eighth embodiment, the geometric model is used instead of cutting out the subject region, a natural three-dimensional image can be formed from one image without the necessity of cutting out the subject region. Further, the use of the geometric model which is most likely to match the subject enables formation of a more natural three-dimensional image.

It is to be understood that there is no intention to limit the present invention to the above described embodiments, but the present invention is intended to cover various modifications and equivalent arrangements within the spirit and scope of the appended claims.

For example, although in the above described embodiments, the images of subjects shot by the camera are temporarily stored in the hard disk of the PC as the image processor, this is not limitative, but the images of subjects shot by the camera may be temporarily recorded in another PC prepared in advance for recording images so that the image data can be read by the image processor via a network.

For example, one user A takes a photograph by the camera at a remote location, records an image photographed by the camera in a portable PC, and connects the PC to the network to transfer digital image data. Another user B connects the PC as the image processor, to which is connected the printer, to the network at another location so that the image data can be directly taken into the processing program and a three-dimensional image can be printed and observed. Alternatively, the user A may remotely operate the image processor to instantaneously acquire the three-dimensional image from a distant place.

Further, although in the above described embodiments, the generated three-dimensional striped image is directly printed, this is not limitative, but a three-dimensional image synthesized from an image template or a character template such as a photo-frame, Christmas card, and animation character may be printed.

Further, although in the above described embodiments, the three-dimensional image forming system is based on the lenticular plate three-dimensional image forming method, this is not limitative, but the present invention may be applied to a three-dimensional image forming system based on the integral photography or the barrier method. Further, although in the above described embodiments, the three-dimensional image is finally outputted by the printer, this is not limitative, but the three-dimensional image may be outputted on a so-called eyeglassless display that is constructed by attaching a lenticular sheet to a liquid crystal display or the like.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the embodiment described above, and hence the storage medium on which the program code is stored constitutes the present invention.

In the above described embodiments, the program code shown in the flow chart of FIG. 11 or 16 is stored in the storage medium. Examples of the storage medium for supplying the program code include a ROM, a flexible disk, and a nonvolatile memory card.

The above described embodiments enable acquisition of multiple viewpoint images from one image, printing of a three-dimensional image synthesized from the multiple viewpoint images, and observation of a three-dimensional image of a subject through the optical member such as a lenticular sheet. Moreover, the above described embodiments enable a natural three-dimensional image to be observed in which the subject does not look like a partition in the background. Further, the above described embodiments enable formation of a three-dimensional image by simple operation.

What is claimed is:

1. An image forming apparatus comprising:
    image acquiring means for acquiring an image of a subject as a subject image;
    parallax map acquiring means for acquiring a parallax map corresponding to the subject image acquired by said image acquiring means and representing a depth distribution of the subject;
    image processing means for synthesizing a three-dimensional image such that pixels of same coordinates in respective images of a multiple viewpoint image sequence of the subject viewed from a plurality of viewpoints are arranged as adjacent pixels in accordance with an arrangement of the viewpoints of the images based on the subject image acquired by said image acquiring means and the parallax map acquired by said parallax map acquiring means;
    output means for outputting the three-dimensional image synthesized by said image processing means; and
    an optical member having a cyclic structure superposed on the three-dimensional image outputted from said output means;
    wherein said image processing means comprises:
    first means for finding viewpoint positions and pixel positions to which the multiple viewpoint image sequence belongs with respect to respective pixels of the three-dimensional image to be synthesized;
    second means for finding a parallax deviation from the parallax map acquired by said parallax map acquiring means based on the viewpoint positions and the pixel positions acquired by said first means;
    third means for finding pixels values of the subject image corresponding to the respective pixels of the three-dimensional image according to the parallax deviation acquired by said second means;
    fourth means for writing the pixel values of the subject image acquired by said third means into the respective pixels of the three-dimensional image; and
    wherein said second means comprises:
    fifth means for finding a first parallax deviation from parallaxes in the parallax map at the pixel positions of the subject image corresponding to the respective pixels of the three-dimensional image by using the viewpoint positions and the pixel positions found by said first means; and
    sixth means for finding a second parallax deviation from the parallax map acquired by said parallax map acquiring means by using the viewpoint positions and the pixel positions found by said first means, and then correcting the second parallax deviation based on the first parallax deviation.

2. An image forming apparatus according to claim 1, wherein said output means is a printer.

3. An image forming apparatus according to claim 1, wherein said optical member is a lenticular sheet.

4. An image forming apparatus according to claim 1, wherein said parallax map acquiring means comprises:
   subject region acquiring means for acquiring a subject region based on the subject image acquired by said image acquiring means; and
   parallax map extracting means for extracting a parallax map based on the subject region acquired by said subject region acquiring means.

5. An image forming apparatus according to claim 1, wherein said image acquiring means acquires the subject image of the subject viewed from the plurality of viewpoints, and said parallax map acquiring means extracts a parallax map based on the subject image of the subject viewed from the plurality of viewpoints.

6. An image forming method executed by a stereoscopic image forming apparatus comprising image acquiring means for acquiring an image of a subject as a subject image, parallax map acquiring means for acquiring a parallax map corresponding to the subject image acquired by said image acquiring mesas and representing a depth distribution of the subject, image processing means for subject image, and output means for outputting the three-dimensional image synthesized by said image processing means such that a stereoscopic image of the subject can be observed through an optical member having a cyclic structure superposed on the three-dimensional image,
   the method comprising:
   a first step of finding viewpoint positions and pixel positions to which the multiple viewpoint image sequence belongs with respect to respective pixels of the three-dimensional image to be synthesized;
   a second step of finding a parallax deviation from the parallax map acquired by said parallax map acquiring means based on the viewpoint positions and the pixel positions acquired in said first step;
   a third step of finding pixels values of the subject image corresponding to the respective pixels of the stereoscopic image according to the parallax deviation acquired in said second step;
   a fourth step of writing the pixel values of the image of the subject acquired in said third step into the respective pixels of the three-dimensional image; and
   wherein said second step comprises:
   a fifth step of finding a first parallax deviation from parallaxes in the parallax map at the pixel positions of the subject image corresponding to the respective pixels of the three-dimensional image by using the viewpoint positions and the pixel positions found in said first step; and
   a sixth step of finding a second parallax deviation from the parallax map acquired by said parallax map acquiring means by using the viewpoint positions and the pixel positions found in said first step, and then correcting the second parallax deviation based on the first parallax deviation.

7. A stereoscopic image forming method that enables a stereoscopic image of a subject to be observed through an optical member having a cyclic structure by synthesizing multiple viewpoint images into a stereoscopic image, printing the stereoscopic image by printing means, and superposing the optical member on the printed stereoscopic image, comprising:
   a dividing step of dividing a three-dimensional image and synthesizing the divided three-dimensional images;
   a control step of providing control such that the synthesized divided three-dimensional images are sequentially outputted to the printing means; and
   wherein said control step comprises finding viewpoint positions in the multiple viewpoint images to which respective lines of the three-dimensional image to be outputted belong and image regions in images at the viewpoint positions corresponding to the respective lines of the three-dimensional image, generating image data of three-dimensional image of the respective lines reversed in vertical and horizontal directions from the image regions, and sequentially outputting the image data to the printing means.

8. A stereoscopic image forming method according to claim 7, wherein said control step comprises finding viewpoint positions and pixel positions in the multiple viewpoint images to which respective pixels of respective blocks of the three-dimensional image to be outputted belong, sequentially writing pixels in images at the viewpoint positions into the pixels of the three-dimensional image, generating image data of the respective blocks of the three-dimensional image, and sequentially outputting the image data to the printing means.

9. A stereoscopic image forming apparatus according to claim 7, wherein said optical member is a lenticular sheet.

10. A stereoscopic image forming system that that enables a stereoscopic image of a subject to be observed through an optical member having a cyclic structure by synthesizing multiple viewpoint images into a stereoscopic image, printing the stereoscopic image by printing means, and superposing the optical member on the printed stereoscopic image, comprising:
    control means for providing control such that a three-dimensional image is divided, the divided three-dimensional images are synthesized, and the synthesized divided three-dimensional images are sequentially outputted to the printing means; and
    wherein said control means finds viewpoint positions in the multiple viewpoint images to which respective lines of the three-dimensional image to be outputted belong and image regions in images at the viewpoint positions corresponding to the respective lines of the three-dimensional image, generates image data of three-dimensional image of the respective lines reversed in vertical and horizontal directions from the image regions, and sequentially outputs the image data to the printing means.

11. A stereoscopic image forming system according to claim 10, wherein said control means finds viewpoint positions and pixel positions in the multiple viewpoint images to which respective pixels of respective blocks of the three-dimensional image to be outputted belong, sequentially writes pixels in images at the viewpoint positions into the pixels of the three-dimensional image, generates image data of the respective blocks of the three-dimensional image, and sequentially outputs the image data to the printing means.

12. A stereoscopic image forming system that comprises image acquiring means for acquiring multiple viewpoint images of a subject viewed from a plurality of viewpoints, image processing means for synthesizing a three-dimensional image such that pixels of same coordinates in respective images of the multiple viewpoint images of the subject are arranged as adjacent pixels in accordance with an arrangement of the viewpoints of the images, and printing means for printing the three-dimensional image, wherein a stereoscopic image of the subject can be observed Through an optical member having a cyclic structure and superposed on the three-dimensional image printed by said printing means, and wherein said image processing means divides the three-dimensional image and synthesizes the divided stereoscopic images, and sequentially outputs the synthesized divided stereoscopic images to said printing means; and wherein said image processing means finds viewpoint positions in the multiple viewpoint images to which respective lines of the three-dimensional image to be outputted belong and image regions in images at the viewpoint positions corresponding the respective lines of the three-dimensional image, generates image data of three-dimensional image of the respective lines reversed in vertical and horizontal directions from the image regions, and sequentially outputs the image data to the printing means.

13. A stereoscopic image forming system according to claim 12, wherein said image processing means finds viewpoint positions and pixel positions in the multiple viewpoint images to which respective pixels of respective blocks of the three-dimensional image to be outputted belong, sequentially writes pixels in images at the viewpoint positions into the pixels of the three-dimensional image, generates image data of the respective blocks of the three-dimensional image, and sequentially outputs the image data to the printing means.

14. A stereoscopic image forming system comprising:
  image acquiring means for acquiring an image of a subject as a subject image;
  region acquiring means for acquiring a subject region from the subject image;
  parallax map extracting means for extracting a parallax map representing a depth distribution of the subject from the subject region;
  multiple viewpoint image generating means for generating multiple viewpoint images of the subject viewed from a plurality of viewpoints based on the subject image and the parallax map;
  image synthesizing means for synthesizing a three-dimensional image such that pixels of same coordinates in respective ones of the multiple viewpoint images of the subject are arranged as adjacent pixels in accordance with an arrangement of the viewpoints of the images;
  output means for outputting the synthesized three-dimensional such that a stereoscopic image of the subject can be observed through an optical member having a cyclic structure superposed on the three-dimensional image; and
  wherein the subject region corresponds to respective pixels of the subject make, and comprises two-dimensional array mask data representative of whether the subject region is a subject or a background, and said parallax extracting means extracts the parallax man by blurring the mask data by two-dimensional filtering.

15. A stereoscopic image forming system according to claim 14, wherein said parallax extracting means estimates a three-dimensional form of the subject from the subject region, and extracts the parallax map based on the estimated three-dimensional form.

16. A stereoscopic image forming method comprising the steps of:
  acquiring an image of a subject as a subject image;
  acquiring a subject region from the subject image;
  extracting a parallax map representing a depth distribution of the subject from the subject region;
  generating multiple viewpoint images of the subject viewed from a plurality of viewpoints based on the subject image and the parallax map;
  synthesizing a three-dimensional image such that pixels of same coordinates in respective ones of the multiple viewpoint images of the subject are arranged as adjacent pixels in accordance with an arrangement of the viewpoints of the images; and
  outputting the synthesized three-dimensional image such that the synthesized three-dimensional image can be observed through an optical member having a cyclic structure superposed synthesized three-dimensional image; and
  wherein the subject region corresponds to respective pixels of the subject image, and comprises two-dimensional array mask data representative of whether the subject region is a subject or a background, and in said step of extracting the parallax map, the parallax map is extracted by blurring the mask data by two-dimensional filtering.

17. A stereoscopic image forming method according to claim 16, wherein in said step of extracting the parallax map, a three-dimensional form of the subject is estimated from the subject region, and the parallax map is extracted based on the estimated three-dimensional form.

* * * * *

UNITED STATES PATENT AND TRADEMARK OFFICE
CERTIFICATE OF CORRECTION

PATENT NO. : 7,113,634 B2  
APPLICATION NO. : 10/207457  
DATED : September 26, 2006  
INVENTOR(S) : Kotaro Yano It is certified that error appears in the above-identified patent and that said Letters Patent is hereby corrected as shown below:

Column 4, lines 11-12, after "system" delete second "that"

Column 12, line 41, delete period after "image"

Column 19, line 55, delete "(i.e" and insert -- (i.e.) --

Column 35, line 27, claim 6 delete "mesas" and insert -- means --

Signed and Sealed this

Second Day of October, 2007

JON W. DUDAS  
*Director of the United States Patent and Trademark Office*